United States Patent [19]

Ikeda

[11] Patent Number: 4,933,789
[45] Date of Patent: Jun. 12, 1990

[54] CASSETTE TYPE MAGNETIC READING/REPRODUCING APPARATUS

[75] Inventor: Hajime Ikeda, Tokyo, Japan

[73] Assignee: Sony Corporation, Tokyo, Japan

[21] Appl. No.: 239,616

[22] Filed: Sep. 1, 1988

[30] Foreign Application Priority Data

Sep. 14, 1987 [JP] Japan .................. 62-230597

[51] Int. Cl.$^5$ .......................................... G11B 15/675
[52] U.S. Cl. ........................................ 360/85; 360/71; 360/96.5
[58] Field of Search ............... 360/96.5, 96.6, 85, 360/71

[56] References Cited

U.S. PATENT DOCUMENTS

| 4,639,797 | 1/1987 | Kobayashi et al. | 360/85 |
| 4,652,948 | 3/1987 | Umeda | 360/85 |
| 4,764,821 | 8/1988 | Aoki et al. | 360/85 |
| 4,775,904 | 10/1988 | Kimura et al. | 360/85 |
| 4,788,609 | 11/1988 | Yamada et al. | 360/85 |
| 4,792,871 | 12/1988 | Hutter | 360/85 |
| 4,800,449 | 1/1989 | Yamasaki | 360/71 |
| 4,814,911 | 3/1989 | Naoi et al. | 360/85 |
| 4,866,552 | 9/1989 | Nagase | 360/71 |

Primary Examiner—Robert S. Tupper
Attorney, Agent, or Firm—Lewis H. Eslinger; Jay H. Maioli

[57] ABSTRACT

A cassette type magnetic recording/reproducing apparatus, such as a tape recorder, is disclosed, in which a magnetic tape accommodated in a tape cassette attached at a tape cassette attachment position within the main body of the apparatus is extracted by a loading mechanism so as to be loaded onto a predetermined tape running passage in the apparatus. According to the invention, the loading operation of the magnetic tape by the loading mechanism is enabled on the condition that it is sensed that a cassette holder for attaching the tape cassette at the tape cassette attachment position is locked at the tape cassette attachment position and that the tape cassette is attached at the tape cassette attachment position, in such a manner that a positive tape loading operation is assured and the magnetic tape as well as various operating units within the main body of the apparatus are protected from damage.

9 Claims, 15 Drawing Sheets

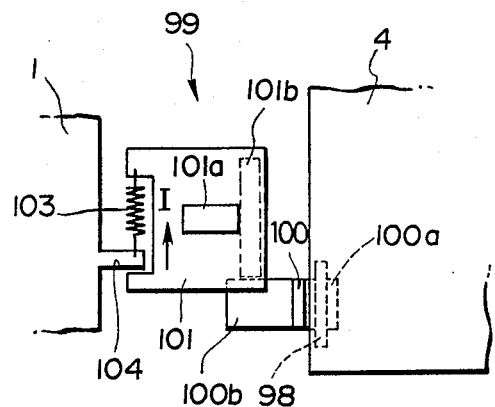
FIG.12(A)
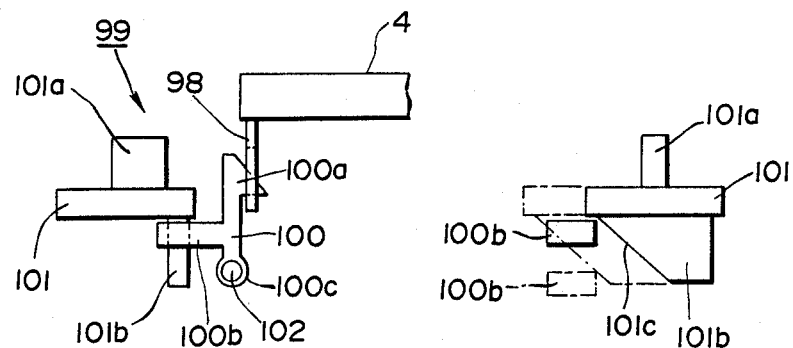
FIG.12(B)     FIG.12(C)

CASSETTE TYPE MAGNETIC READING/REPRODUCING APPARATUS

BACKGROUND OF THE INVENTION

1. Field of the Invention

This invention relates to a cassette tape magnetic recording/reproducing apparatus, such as a tape recorder, wherein the magnetic tape accommodated within a tape cassette attached at a tape cassette attachment position within the main body of the recording/reproducing apparatus is extracted by a loading mechanism or unit and loaded onto a predetermined tape running route or path.

More particularly, the present invention relates to a cassette tape magnetic recording/reproducing apparatus wherein the loading operation of the magnetic tape is enabled on the condition that it is sensed that a cassette holder for attaching the tape cassette at the tape cassette attachment position and that the tape cassette is attached at the tape cassette attachment position, in such a manner that a positive tape loading operation is assured and the magnetic tape as well as various operating units within the main body of the apparatus are protected from possible damage.

2. Description of the Prior Art

There is proposed and actually employed a cassette type magnetic recording/reproducing apparatus, such as a rotary magnetic head type audio PCM tape recorder or a video tape recorder, wherein the tape cassette accommodating a magnetic tape is employed as the recording medium and the magnetic tape accommodated within the tape cassette is caused to run as it is wrapped around the tape guide drum of the rotational magnetic head device, and slidability contacted by a rotating magnetic head for recording/reproducing audio or video signals.

The above described cassette type magnetic recording/reproducing apparatus is provided with a cassette holder and a tape cassette transfer member supported for movement between a tape cassette inserting and detachment position and a tape cassette attachment position, and the tape cassette is attached at the tape cassette attachment position by way of the tape cassette transfer member or the cassette holder.

In a cassette type magnetic recording/reproducing apparatus employing a rotating magnetic head device, the magnetic tape taken out from the tape cassette is wrapped around a tape guide drum of the rotating magnetic head device at a predetermined angle for slidingly contacting with the rotating magnetic head. For this reason, the tape running route or path is intricate in profile and in the form of a letter M or a letter U with the magnetic head device as the center. Since the magnetic tape is loaded along an intricate tape route, a loading mechanism including a shifting guide roller is provided in the cassette type magnetic recording/reproducing apparatus. The magnetic tape is taken out of the tape cassette by way of the aforementioned loading mechanism so as to be wrapped around the tape guide drum and automatically loaded onto the tape travel path.

Therefore, in a cassette type magnetic recording/reproducing apparatus in which the magnetic tape is automatically loaded onto the tape travel path through the loading mechanism, it is necessary that the tape cassette be attached positively and accurately at the tape cassette attachment position. The loading mechanism is so constructed and designed that the magnetic tape extending on the front side of the tape cassette can be hooked for extraction by tape guide means, such as shifting guide rollers. Therefore, when the tape cassette is not attached accurately at the predetermined tape cassette attachment position, it may occur that the tape guide means are not engaged with the magnetic tape or are disengaged therefrom during extraction so that it may become impossible to perform a tape loading operation. Also, when the tape guide means are not engaged accurately with the magnetic tape, the magnetic tape may not be reliably protected from possible damage, while the loading mechanism itself may be destroyed.

In the conventional cassette type magnetic recording/reproducing apparatus, the operation of the loading mechanism is started as soon as it is sensed that the cassette holder has been shifted to the tape cassette attachment position to effect the loading of the magnetic tape, or alternatively, a loading start switch is actuated after the cassette holder has been shifted to the tape cassette attachment position to start loading of the magnetic tape. Thus, in the conventional cassette type magnetic recording/reproducing apparatus, the loading operation is started without checking to see that the cassette holder has been correctly shifted to the tape cassette attachment position and that the tape cassette attachment position and that the tape cassette has been correctly attached to the tape cassette attachment position. Thus there is a risk that the loading mechanism is actuated when the cassette holder has been shifted to the tape cassette attachment position, even though the tape cassette is not attached correctly at the tape cassette attachment position. Therefore it may occur that the magnetic tape loading may cause damage to the magnetic tape and to operating units including the tape loading mechanism.

In addition, in the above described cassette type magnetic recording/reproducing apparatus employing the rotating magnetic head device, the magnetic tape is extracted out of the tape cassette and wrapped around the rotating magnetic head device spaced apart from the tape cassette along the tape travel path or route. Supposing that the tape cassette ejecting operation is performed during the loading operation in which the magnetic tape is extracted or pulled out onto the tape route or the unloading operation in which the magnetic tape is pulled back into the tape cassette or under the loading condition in which the magnetic tape is wrapped around the rotating magnetic head device, the tape cassette ejecting operation is performed while the magnetic tape is still extended on the tape route without being accommodated within the tape cassette. The magnetic tape is pulled out in such case as it is entwined about tape guide means such as tape guide rollers so that the tape may be broken or otherwise damaged. In addition to the magnetic tape being damaged, the mechanical units including the tape running mechanism or the loading mechanism may be damaged by the magnetic tape remaining on the tape route.

BRIEF SUMMARY OF THE INVENTION

It is therefore a principal object of the present invention to provide a cassette type magnetic recording/reproducing apparatus wherein the operation of the loading mechanism is enabled only when the tape cassette is attached at the predetermined tape cassette attachment position in order to provide for safe and reliable magnetic tape loading.

It is another object of the present invention to provide a cassette type magnetic recording/reproducing apparatus wherein safe and reliable magnetic tape loading is enabled for protecting the tape cassette including the magnetic tape and various operating units of the main body of the apparatus including the loading mechanism.

It is a further object of the present invention to provide a cassette type magnetic recording/reproducing apparatus wherein the tape cassette ejecting operation may be inhibited during the loading operation in which at least the magnetic tape is kept in the state of being out of the tape cassette, or during the unloading operation.

It is yet another object of the present invention to provide a cassette type magnetic recording/reproducing apparatus wherein a safe and reliable ejecting operation is enabled to protect the magnetic tape as well as various operating units of the main body of the recording/reproducing apparatus such as the tape running or loading mechanism.

According to the present invention, there is provided a cassette type magnetic recording/reproducing apparatus wherein a magnetic tape accommodated in a tape cassette attached at the tape cassette attachment position is pulled out by a loading mechanism and loaded onto a predetermined tape running path or route. The apparatus includes a cassette holder supported for movement between a tape inserting and detachment position and a tape cassette attachment position, locking means for locking the cassette holder in the tape cassette attachment position, cassette holder lock sensor means for sensing that the cassette holder is locked in the tape cassette attachment position and tape cassette attachment sensor means for sensing that the tape cassette accommodated and held in the cassette holder is attached at the tape cassette attachment position. The loading of the magnetic tape accommodated inside the tape cassette onto a predetermined tape running route is enabled only when the cassette holder lock is sensed by the cassette holder lock sensor means and tape cassette attachment is simultaneously sensed by the tape cassette attachment sensor means.

According to the above described cassette type magnetic recording/reproducing apparatus, it is sensed by the cassette holder loading sensor whether or not the cassette holder accommodating and holding the tape cassette has been locked at the tape cassette attachment position, while it is also sensed by the tape cassette attachment sensor whether or not the tape cassette held in the cassette holder has been attached at the tape cassette attachment position. The operation of the loading mechanism is started when the cassette holder lock is sensed by the cassette holder lock sensor and also the tape cassette attachment is simultaneously sensed by the tape cassette attachment sensor to enable the loading of the magnetic tape.

Other objects and advantages of the invention will be apparent from the following description taken in conjunction with the accompanying drawings.

BRIEF DESCRIPTION OF THE DRAWINGS

FIG. 12A is a diagrammatic plan view showing an outer lid opening and closing mechanism or unit.

FIG. 12B is a front view showing the outer lid opening and closing mechanism or unit.

FIG. 12C is a side view showing the lid-opening operation of the lid opening and closing mechanism.

DETAILED DESCRIPTION

A concrete embodiment of the present invention, when applied to a rotary magnetic head type audio PCM tape recorder, will be hereafter explained by referring to the accompanying drawings.

Tape Cassette Attached to a Rotary Magnetic Head Type Digital Audio Tape Recorder (FIGS. 16 to 19)

Before describing the concrete embodiment of the rotating magnetic head type digital audio tape recorder embodying the present invention, the tape cassette employed in the tape recorder is explained.

Figure 17:
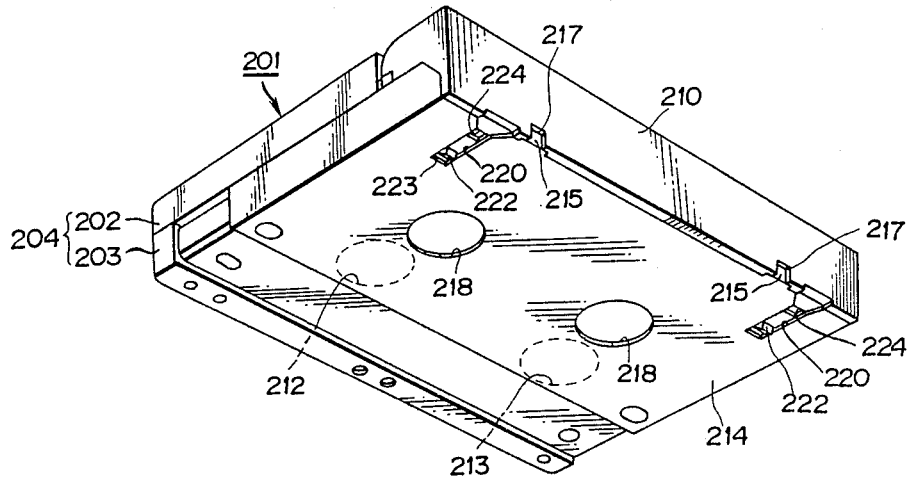
FIG. 17 is a perspective view from a bottom side of the above tape cassette.
Figure 18:
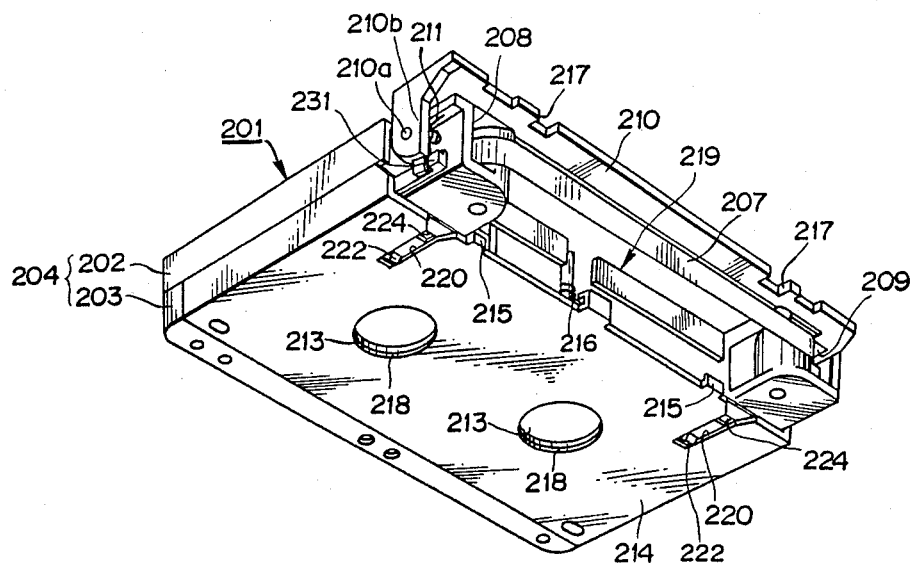
FIG. 18 is a perspective view showing an opening and closing state of a front lid.

Referring to FIGS. 16 to 19, a tape cassette 201 is formed of a cassette body 204 consisting of an upper half 202 and a lower half 203 abutted and connected to each other. A pair of tape reels 205 and 206 are rotatably supported within the cassette body 204 and a magnetic tape 207 is wrapped around these tape reels 205 and 206. The tape 207 is extended outwardly of the front side of the cassette body 204 via tape extraction openings 208 and 209 formed on both forward surface sides of the cassette body 204, and is wound from the one tape reel 205 to the other tape reel 206. On the front side of the cassette body 204, a front cover or lid 210 is rotatably mounted for protecting the magnetic tape 207 extended on the front side of the cassette body 204 during non-attachment of the tape cassette 201 to the tape recorder. As shown in FIG. 18, this front lid 210 is biased to be turned in a direction of closing the lid 210 for covering the magnetic tape 207 extended on the front side of the cassette body 204 by a torsion coil spring 211 acting as biasing means wound about a rotary shaft 210a.

Figure 19:
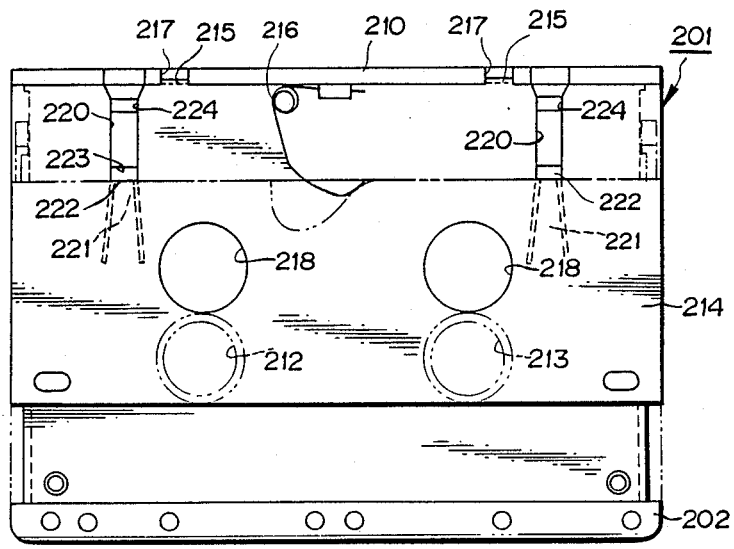
FIG. 19 is a bottom view showing a shifting state of a closure plate.

As shown in FIGS. 17, 18 and 19, a closure plate 214 having a substantially U-shaped cross-section mounted on the bottom side of the cassette body 204 to slide in a back and forth direction for closing through-holes 212 and 213 formed in the bottom side of the cassette body 204 for accommodating reel shafts during non-attachment of the tape cassette to the tape recorder for preventing intrusion of dust and dirt into the cassette body 204 to protect the magnetic tape 207. A pair of lugs 215, 215 are formed on the forward and edge of the closure plate 214. When the plate is urged by a torsion spring 216 mounted to the cassette body 204 so as to be shifted towards the front side of the cassette body 204 in a direction of closing the through-holes 212, 213 for the reel shafts, as shown in FIG. 19, the lugs 215, 215 are engaged with the front side of the cassette half 204, as shown in FIG. 17, for regulating the shifting position of the closure plate 214. On the lower edge of the front lid 210 registering with the lugs 215, 215, there are formed recesses 217, 217 acting as clearances when the cassette body 204 is shifted in relation to the closure plate 214.

A pair of through-holes 218, 218 are formed in the main surface of the closure plate 214 and, when the closure plate 214 is relatively shifted towards the rear of the cassette half 204, these through-holes 218, 218 are in register with the through-holes 212, 213 formed in the bottom plate of the lower half 203, such that reel drive shafts, not shown, provided in the tape recorder, are intruded into the cassette body 204. As the closure plate 214 is moved forward so that, as shown in FIG. 18, the plate 214 closes the lower portion of a space 219 confronted by tape extraction means of a loading unit, which is provided in the tape recorder for extracting the tape 207 lying on the front side of the cassette body 204 from the cassette body 204, the through-holes 218, 218 in the closure plate 214 and the through-holes 212, 213 in the lower half 203 are deviated relative to each other, the through-holes 212, 213 being closed by the main surface of the closure plate 214.

The plate 214 is formed with shallow grooves 220 into which are intruded a pair of ribs formed with the bottom plate of the cassette holder as later described and acting as means for disengaging the engaging means of the closure plate 214. These shallow grooves 220 are formed for extending in the fore and aft direction of the closure plate 214 and being opened on the forward edge of the plate 214. Each of these shallow grooves 220 is formed with an engaging opening 223 and an engaging recess 224 into which is engaged each of engaging projections 222 of locking members 221 provided to the cassette body 204 for retaining the closure plate 214 in a closure position in which the closure plate 214 closes the space 219 and the through-holes 212 and 213 and an open position in which the space 219 and the through-holes 212 and 213 are opened. In forming the locking member 221, the bottom plate of the lower half 203 is cut through in the form of a letter U so that the rear end of each of the locking members 221 connects to the bottom plate of the lower half 203 and a semispherical engaging projection is formed on the lower surface of the forward end section of each of the locking members 221.

As shown in FIGS. 17 and 19, when the closure plate 214 is closed, the projections 222 of the locking members 221 are engaged in the engaging openings 223 formed in the closure plate 214 for retaining the closure plate 214 against shifting towards the open position.

Within the cassette body 204, a reel lock lever 226 is provided to extend widthwise on the inner surface of the upper half 202. The lever 226 serves the purpose of preventing the tape reels 205 and 206 rotatably mounted within the cassette body 204 from being turned inadvertently and thereby loosened and/or injured during non-attachment to the tape recorder. The lever 226 is slidably supported in the fore and aft direction with respect to the tape reels 205 and 206 with a pair of slide guide pins 227, 227 formed on the inner surface of the upper half 202 and engaging in a pair of elongated openings 228, 228 formed in the lever 226. The lever 226 is biased to be shifted towards the tape reels 205 and 206 by a torsion coil spring 209 mounted to the inner side of the upper half 202. The reel lock lever 226 is formed on its one side with thrust members 230, 230 abutting on the upper peripheral surfaces of the tape reels 205 and 206 for locking the tape reels 205 and 206 against rotation. On both sides of the reel lock lever 226 are formed shifting arms 231, 231 for extending in the fore and aft direction along the lateral sides of the cassette body 204. These shifting arms 231, 231 engage with rotary members 210b, 210b of the front lid 210 when the front lid 21 is opened. When the front lid 210 is turned for opening the front side of the cassette body 204 as shown in FIG. 18, the shifting arms 231 are shifted by the rotary members 210b of the lid 210 towards the front of the cassette body 204, such that the reel lock lever 226 is shifted in a direction away from the tape reels 205 and 206 against the urging force of the torsion coil spring 229. By such shifting of the reel lock lever 226 the tape reels 205, 206 are released from the pressure of the thrust members 230, 230 and are free to be rotated to permit the magnetic tape 207 to be reeled out of the cassette body 204.

General Structure of the Rotary Magnetic Head Type Audio PCM Tape Recorder (FIGS. 1, 2, 3 and 4)

Figure 1:
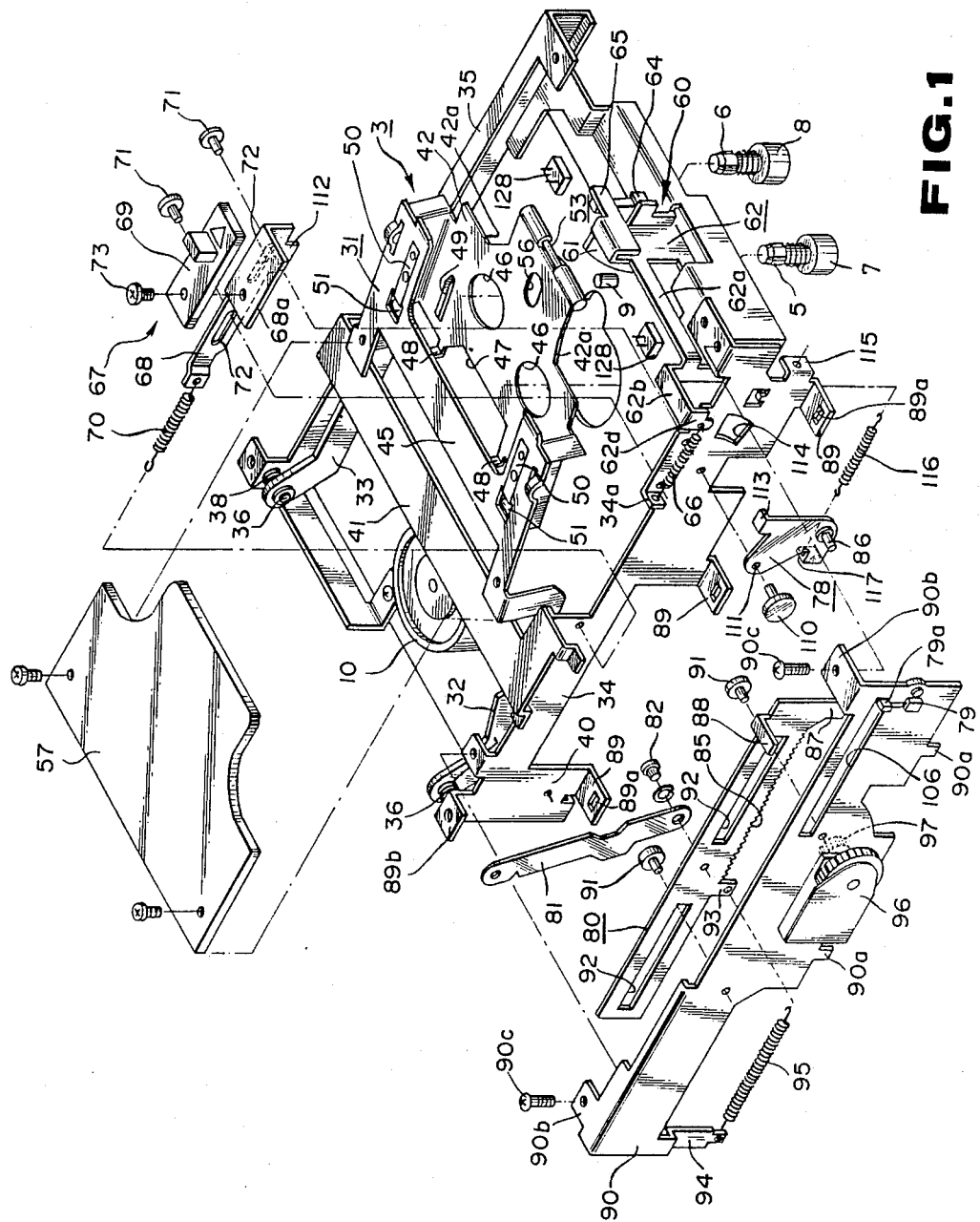
FIG. 1 is an exploded perspective view showing essential portions of a rotating magnetic head type digital audio tape recorder according to the present invention.
Figure 2:
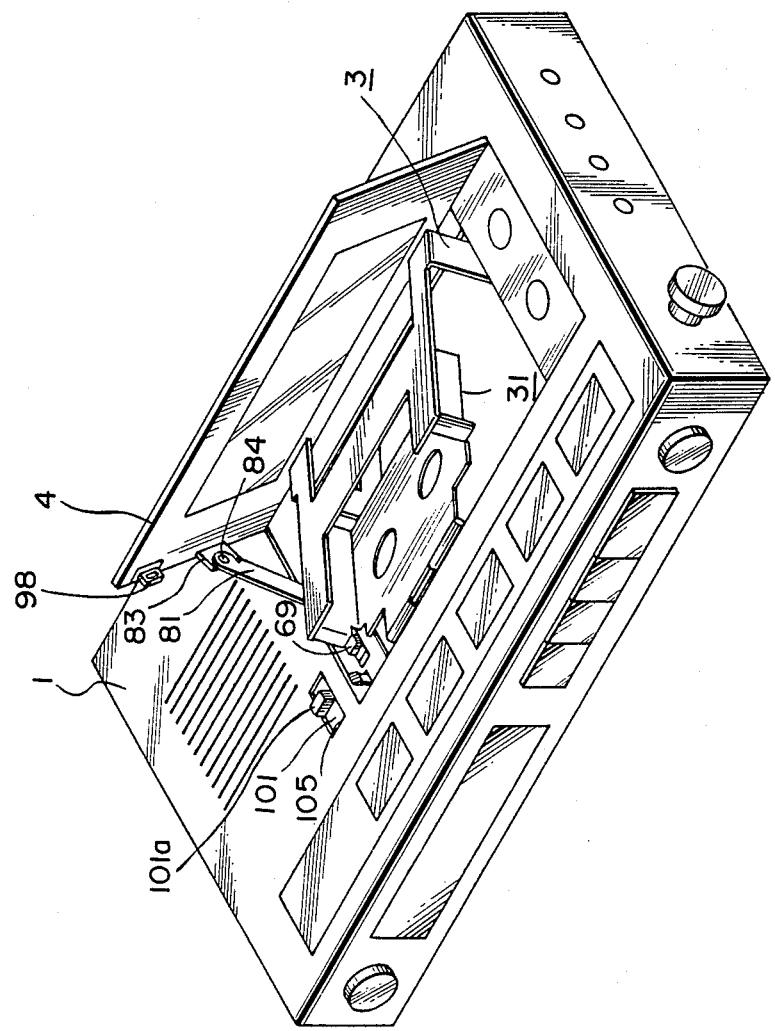
FIG. 2 is a perspective view showing the above tape recorder in its entirety.

The above described rotary tape cassette 201 is mounted to a magnetic head type digital audio tape recorder, as shown in FIGS. 1 and 2, which is comprised of a cassette holder 3 supported by a mechanical chassis 2 disposed in an outer casing 1 making up a main body of the tape recorder for rotation between a tape cassette insertion and take-out position outside of the outer casing 1 and a tape cassette attachment position on the chassis 2 and an outer casing 4 mounted for rotation to the outer casing 1 and adapted to be closed to cover the cassette holder 3 when the cassette holder 3 is turned to the tape cassette attachment position. The above described tape cassette 201 is attached at the tape cassette attachment position as the cassette holder 3 holding the tape cassette 201 therein is turned from the cassette inserting and take-out position to the tape cassette attachment position on the chassis 2. At this tape cassette attachment position, there are provided a pair of reel blocks 7 and 8 provided respectively with reel shafts 5 and 6 engaged respectively with the tape reels 205 and 206 of the tape cassette 201 and adapted to take up the magnetic tape 207 on one of the tape reels 205 and 206 upon rotational operation of these reels 205 and 206. These reel blocks 7 and 8 are driven into rotation by a reel motor, not shown. At the tape cassette attachment position, a height position setting pin 9 is mounted upright for setting the height position of the attached tape cassette 201.

Figure 3:
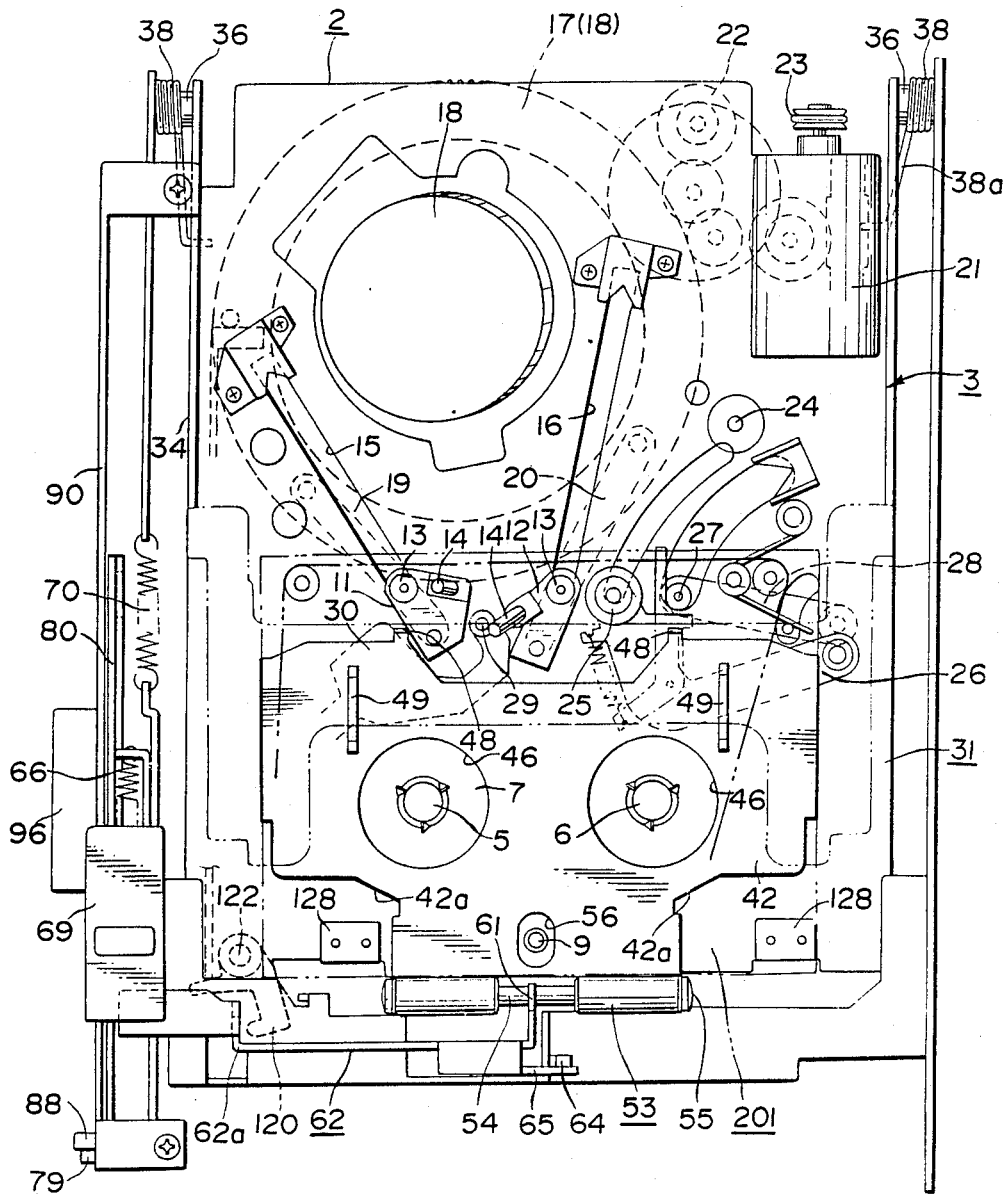
FIG. 3 is a plan view showing a state of a loading mechanism prior to actuation thereof.
Figure 4:
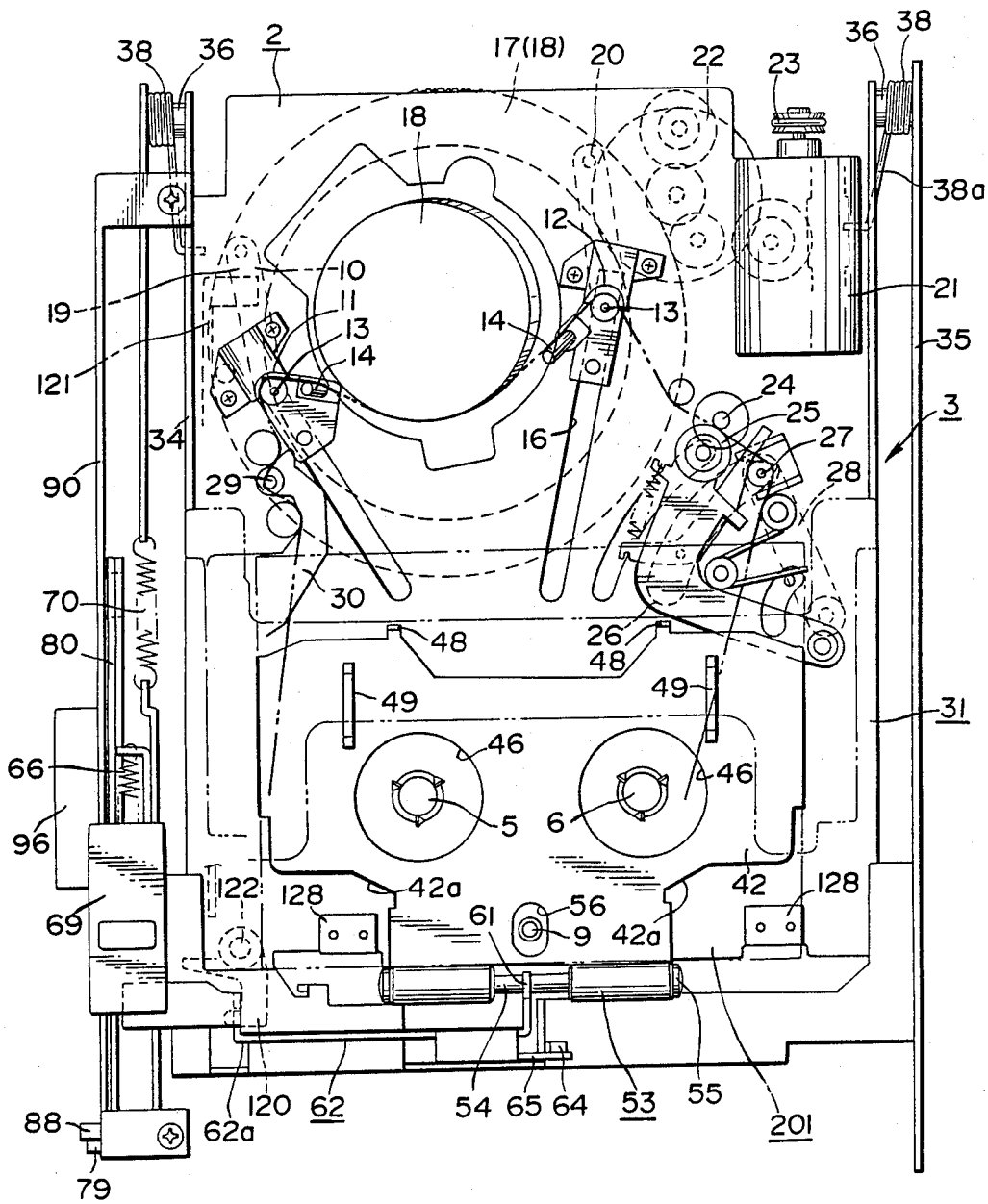
FIG. 4 is a plan view showing a state of the above loading mechanism after actuation thereof.

On the side opposite to the side where the reel blocks are provided for attachment of the cassette 201, there is provided, as shown in FIGS. 3 and 4, a rotary magnetic head device 10 in which is accommodated the magnetic tape 207 reeled out from the tape cassette 201 by way of the mechanical chassis 2. Between the tape cassette attachment position and the rotary magnetic head device 10, there are provided a pair of shift guide blocks 11 and 12 constituting a loading mechanism by which the magnetic tape 207 is taken out from the tape cassette 201 and wrapped about the tape guide drum of the rotary magnetic head device 10. A tape guide roll 13 and an inclined guide pin 14 are mounted so that the magnetic tape 207 is engaged with these guide blocks and thereby guided so as to be wrapped around the tape guide drum of the magnetic head device 10 at a predetermined angle, such as approximately 90°. The shifting guide blocks 11 and 12 are guided by slide guide grooves 15 and 16 formed on the mechanical chassis 2 so as to be shifted between a position shown in FIG. 3 whereat the tape guide roll 13 and the inclined guide pin 14 are confronted to the space 219 of the tape cassette 201 attached to the tape cassette attachment position and a position shown in FIG. 4 laterally of the magnetic head device 10. These shift guide blocks 11 and 12 are shifted by rotationally driving loading rings 17 and 18 provided on the outer perimeter of the rotary magnetic head device 10. Thus the shifting guide blocks 11 and 12 are connected by connecting arms 19 and 20 to the loading rings 17 and 18 and are shifted by these loading rings 17 and 18 which are rotationally driven by the loading motor 21. The loading rings 17 and 18 are connected to the loading motor 21 so that the driving power is transmitted from the motor to the loading rings by way of a connecting gearing 22 and a connecting belt 23.

Between the tape cassette attachment position and the rotary magnetic head device 10, there are rotatably mounted a pinch roll supporting arm 26 carrying an end pinch roll 25 pressed against a capstan shaft 24 to effect constant speed running of the magnetic tape 207, a tape guide supporting arm 28 carrying an end guide pin 27 and a tension regulating arm 30 carrying an end tension regulating guide pin 29 and constituting a tension regulator arm 30. The pinch roll supporting arm 26, tape guide supporting arm 28 and the tension regulating arm 30 are actuated by the rotational operation of the loading rings 17 and 18 adapted for shifting the shifting guide blocks 11 and 12 so as to be turned between a position towards the tape cassette attachment position shown in FIG. 3 and a position towards the rotary magnetic head device 10 shown in FIG. 4, and are turned with the shifting of the shifting guide blocks 11 and 12 for loading the magnetic tape 207 within the tape cassette 201 onto a predetermined tape path along which the tape may travel as it is wrapped within the rotary magnetic head device.

Cassette Holder (FIGS. 1, 5, 6 and 7)

Figure 5:
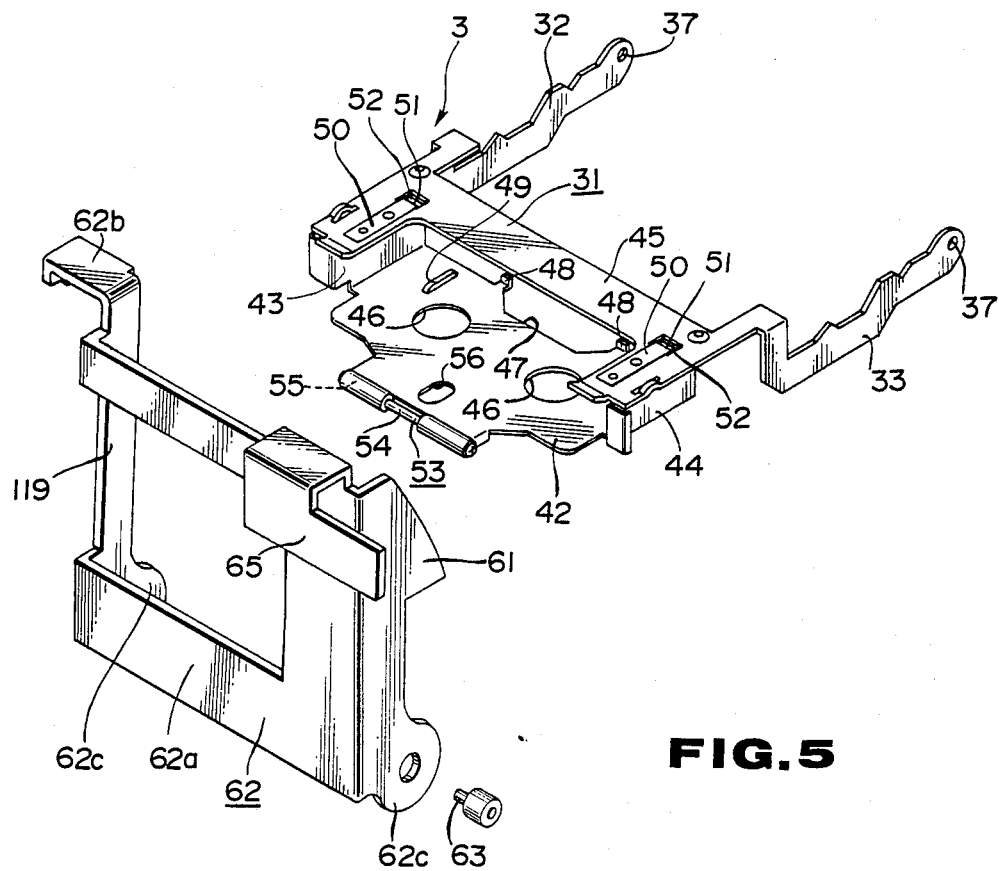
FIG. 5 is a perspective view showing a relation between the cassette holder and the cassette holder locking lever.
Figure 6:
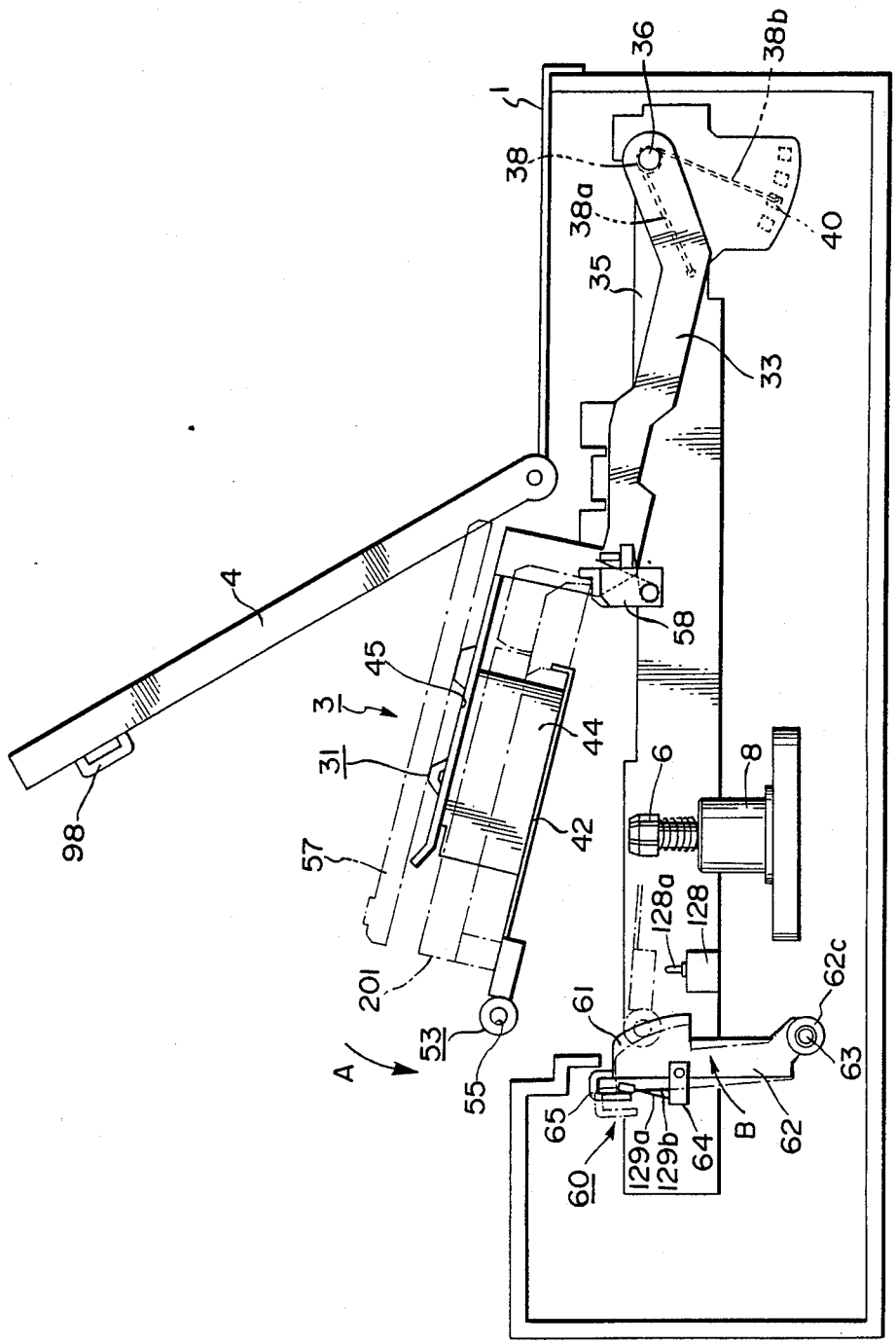
FIG. 6 is a right-hand side view showing a state of rotation of the cassette holder to a tape cassette inserting and detachment position.
Figure 7:
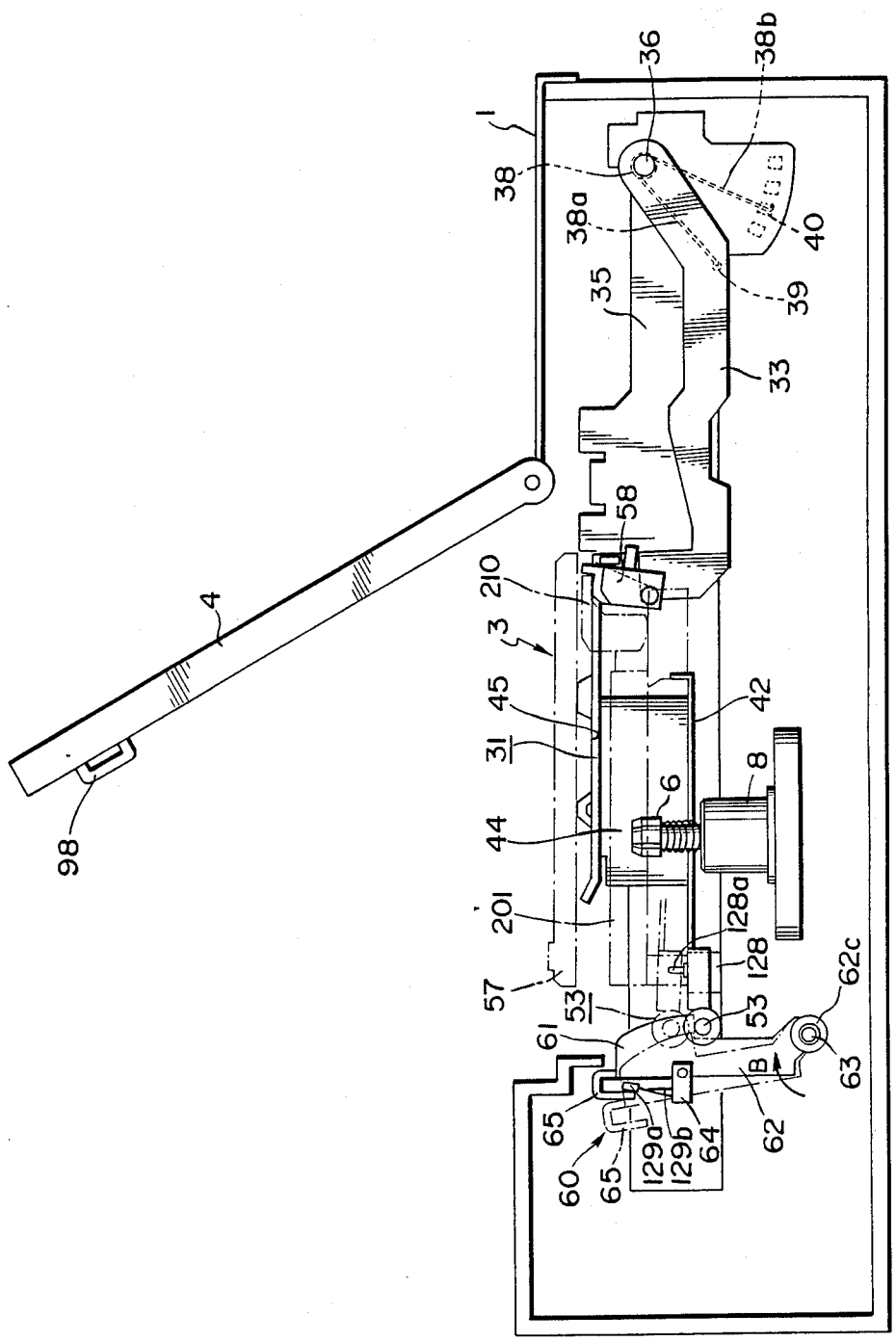
FIG. 7 is a right-hand view showing a state of rotation of the cassette holder to the tape cassette attachment position.

The cassette holder 3 for attaching the tape cassette 201 at the tape cassette attachment position on the mechanical chassis 2 has a pair of rotary arms 32 and 33 extending towards the proximal end from both sides of a holder onto which the tape cassette 201 is inserted and held, as shown in FIGS. 1 and 5. The proximal ends of these rotary arms 32 and 33 are formed with throughholes 37, 37 into which are introduced supporting shafts 36 and 36 formed upright on the confronting inner sides of a pair of chassis frames 34 and 35 attached to the chassis 2, so that the arms 32 and 33 may be turned between the tape cassette inserting and take-out position shown in FIG. 6 and the tape cassette attachment position shown in FIG. 7. The cassette holder 3 is biased to be turned towards the cassette inserting and take-out position by torsion coil springs 38, 38 wound about the supporting shafts 36, such that the cassette holder 3 is biased to be turned to the cassette inserting and take-out position under the force of the torsion coil springs 38, 38 unless the cassette holder is locked by cassette holder locking means as later described. The torsion coil springs 38, 38 wound about the supporting shafts 36, 36 are installed with the ends of the first arms 38a retained in retaining apertures 39 formed in the rotary arms 32 and 33 of the cassette holder 3 and with the ends of second arms 38b retained in retaining apertures 40 formed in the chassis frames 34 and 35, such that the cassette holder 3 is biased to be turned towards the cassette inserting and detaching position. Several of the retaining apertures are formed radially in the chassis frame 34 and 35, as shown in FIGS. 6 and 7, so as to be engaged by the second arms 38b, so that the second arms 38b may be engaged at variable engaging positions for adjusting the rotational urging force of the torsion coil springs 38 and 38 acting on the cassette holder 3. A cassette holder rotation regulating plate 41 is mounted across a pair of chassis frames 34 and 35 adopted for supporting the cassette holder 3. The rotational urging position of the cassette holder 3 by the torsion coil springs 38 and 38 is regulated by having the mid portions of the rotary arms 32 and 33 abutted on the plate 41 for determining the tape cassette inserting and detaching position.

The holder section 31 onto which the tape cassette 201 is introduced and held is box-shaped and comprised of a bottom plate 42 on which the tape cassette 201 rests, side plates 43 and 44 formed upright on both sides of the bottom plate 42 and an upper plate 45 mounted for facing to the bottom plate 42 and for extending across the side plates 43 and 44, as shown in FIGS. 1 and 5. The bottom plate 42 is formed with throughholes 46, 46 into which the reel shafts 5 and 6 transversely spaced apart from each other are introduced. A recess 47 having an inverted trapezoidal form is provided at the center of the rear edge of the bottom plate 42. Both sides of the recess 47 are projected slightly towards the rear and formed with upstanding slide control projections 4 8, 48 adapted for abutting on the lugs 215, 215 provided to the closure plate 214 for controlling the shifting of the closure plate 214 of the tape cassette 201. A pair of ribs 49, 49 adapted for thrusting the locking members 221 retaining the closure plate 214 of the tape cassette 201 are formed on the bottom plate 42 so as to protrude towards the side plates 43 and 44.

The upper plate 45 is provided with a pair of cassette thrusting plates 50, 50 formed by spring plates adapted to thrust and support the tape cassette 201 introduced and held into the holder section 31 in position for preventing accidental removal of the tape cassette 201. These cassette thrusting plates 50, 50 are attached to the upper plate 45 at one end so that pressure rolls 51, 51 mounted to the ends of the plates are confronted to the inside of the holder 31 via through-holes 52, 52 formed in the upper plate 45. It is noted that the cassette thrusting plates 50, 50 are mounted at transversely symmetrical positions for uniformly pressing the region towards both sides of the upper surface of the tape cassette 201 inserted and held on the holder section 31, the aforementioned region corresponding to the shallow grooves 220, 220 formed in the tape cassette 201.

A mating locking portion 53 is provided on the forward end side of the bottom plate 42 of the holder 31 so as to be engaged with a cassette holder lock lever constituting cassette holder locking means as later described. This mating locking member 53 is formed by a shaft 55 and a roller 54 on the front end edge of the bottom plate 42. The mating locking member 53 is so constructed and arranged that the roller 54 is fitted at the midpoint of the shaft 55 so as to face to the center of the front edge of the bottom plate 42, such that the locking position by the cassette holder lock lever is at the forward end edge at the widthwise center of the cassette holder 3.

At the center on the forward end edge of the bottom plate 42, there is formed a through-hole 56 into which is intruded the height position setting pin 9 mounted upright at the aforementioned tape cassette attachment position.

On the upper surface of the holder section 31, an upper surface protecting plate 5 7 is provided for protecting the tape cassette 201 inserted and held on the holder section 31.

The tape cassette 201 is introduced from the side of the front lid 210 into the holder section 31 of the above described cassette holder 3. As the tape cassette 201 is introduced along the surface of the bottom plate 42 of the holder section 31, the tape cassette is introduced as the left and right edges are regulated by the bottom plate 42 and the cassette thrusting plates 50, 50. As the tape cassette 201 is introduced further into the holder section 31, the ribs 49, 49 on the bottom plate 42 are engaged with the shallow grooves 220, 220 formed in the closure plate 214 of the tape cassette 201, so that the lock member 221 adapted for retaining the closure plate 214 at the cassette body 204 is thrusted towards the inside of the cassette holder 3 to release the retention of the closure plate 214. Thus released from retention, the slide control projections 48, 48 at the rear end side of the bottom plate 42 abut on the lugs 215, 215 formed on the foremost part of the closure plate 214 to regulate the shifting of the closure plate 214. With the shifting of the closure plate 214 thus regulated, the tape cassette 201 is further introduced into the inside of the holder 31, so that only the cassette body 204 is shifted towards the inside of the holder section 31. By the relative shifting between the cassette body 204 and the closure plate 214, the through-holes 212, 213 of the cassette body 204 and the through-holes 218, 218 of the closure plate 214 register with each other for exposing or opening the through-holes 212, 213. The position to which the cassette body 204 is introduced until the through-holes 212, 213 are exposed or opened represents the inserting and holding position for the tape cassette 201 into the holder section 31, the through-holes 46, 46 in the bottom plate 42 then being in register with the through-holes 212, 213 to permit the reel shafts 5 and 6 to be engaged with the tape reels 205 and 206.

The front lid 210 of the tape cassette 201 inserted and held in the holding section 31, with the through-holes 212, 213 opened as described above, is unlocked by the relative shifting of the closure plate 214 and turned against the bias of the torsion coil spring 211, such that the front side, along which the magnetic tape 207 of the cassette body 204 is extended, may now be opened.

The cassette holder 3, in which the tape cassette 201 is inserted and held as described above, is shifted to the tape cassette attachment position, when it is turned from the tape cassette inserting and detachment position shown in FIG. 6 in a direction shown by the arrow A in FIG. 6 against the urging of the torsion coil spring 38, 38. The tape cassette 201 inserted and held in the holder section 31 is attached in position, as the attachment height position is regulated by the height position setting pin 9 and as the reel shifts 5, 6 are engaged with the tape reels 205 and 206. During the rotation of the cassette holder 3 to the tape cassette attachment position, the front lid 210 of the tape cassette 201 has its lower edge abutted on a lid opening member 58 provided on the mechanical chassis 2, so that the lid is turned for opening the front side of the cassette body 204 as shown in FIGS. 7 and 18 under the rotational urging force of the lid opening member 58 and against the bias of the torsion coil springs 21. On the other hand, reel lock lever 226 is shifted for unlocking the tape reels 5 and 6 such that the magnetic tape 207 extended on the front side may be now pulled out by the loading mechanism or unit.

Cassette Holder Locking Mechanism (FIGS. 1, 3, 4, 5, 6 and 7)

On the front end side of the chassis 2, facing to the front end side of the cassette holder 3 shifted towards the tape cassette mounting position, there is provided a cassette holder locking mechanism 60 which is a cassette holder locking means adapted for locking the cassette holder 31 at the aforementioned tape cassette attachment position. The cassette holder locking mechanism 60 is comprised of a cassette lock lever 62 rotatably attached to the front end side of the chassis 2 and a locking member 61 provided to one side of the lock lever 62 and adapted for engaging with the mating locking portion 53 provided to the front side of the cassette holder 3 that has been turned to the tape cassette attachment position, the locking member 61 thus locking the cassette holder 3 at the tape cassette attachment position. As shown in FIG. 5, the lock lever 62 is formed by a rectangular rotary plate 62a having a central cut-out, the locking member 61 formed integrally with one side of the plate 62a for extending integrally from the other upper side of the plate 62a facing to the locking member 62b. The proximal end side of the rotary plate 62a is formed with journals 62c, 62c in which supporting shafts 63, 63 provided to the lower front end of the chassis 2 are journaled. On the one side of the rotary plate 62a to which is provided the locking member 61c of the rotary plate 62a is protrudingly mounted a substantially U-shaped switch thrust member 65 adapted to thrust and actuate a cassette holder lock sensor switch 64 adapted for sensing the locking state of the cassette holder lock lever 62 of the cassette holder 3.

As shown in FIGS. 1 and 4, the cassette holder locking lever 62 is mounted for rotation in a direction orthogonal to the mating locking member 53 of the cassette holder 3, with the locking member 61 facing to a position of engagement with the mating locking member 53 at the central position in the left and right direction on the forward end side of the cassette holder 3 turned to the tape cassette attachment position, with the spring retaining member 62b extending over the one chassis frame 34 provided on one side of the mechanical chassis 2 and with the journals 62c, 62c of the rotary plate 62a carried by the supporting shafts 63, 63 of the mechanical chassis 2. The foremost part of the spring retaining member 62b is formed with a spring retaining tongue 62d engaging with one end of a tension coil spring 66 having its other end retained at the spring retaining member 34a formed halfway in the chassis frame 34, such that the cassette holder locking lever 62 is biased so as to be turned towards the cassette holder 3 in the direction indicated by the arrow B in FIGS. 6 and 7. Thus, after the cassette holder 3 is turned to the tape cassette attachment position, the locking lever 62 has its locking member 61 thrusted by the mating locking member 53 of the cassette holder 3 so that the locking lever 62 is turned against the spring force of the tension coil spring 66, after which it is turned in the reverse direction for its sustained engagement with the mating locking member 53 for locking the cassette holder 3.

Cassette Holder Ejection Mechanism (FIGS. 1, 8, 9, 10 and 11)

Figure 8:
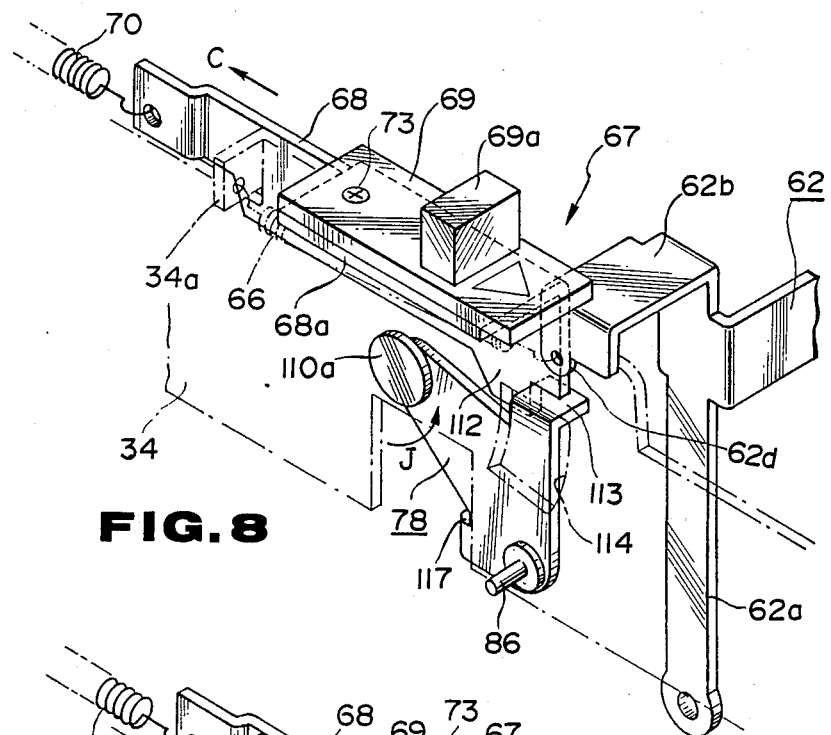
FIG. 8 is a perspective view showing a non-actuated state of an ejection mechanism.
Figure 9:
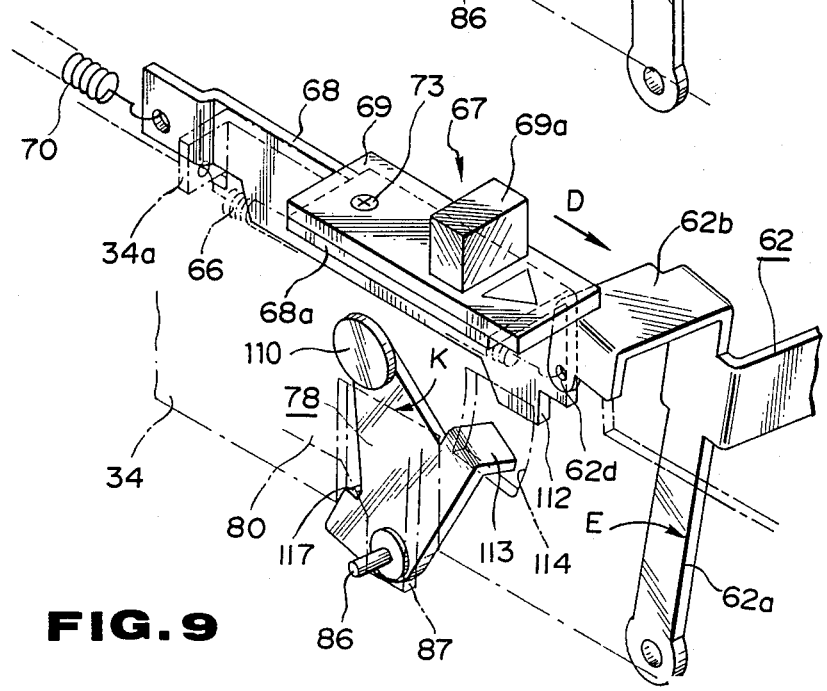
FIG. 9 is a perspective view showing a operating state of the ejection mechanism.

An ejection mechanism 67 adapted for unlocking the cassette holder 3 maintained in the locked state at the tape cassette attachment position by the above described cassette holder locking mechanism, is mounted through the intermediary of the one chassis frame 34. As shown in FIGS. 1, 8 and 9, the ejection mechanism 67 is comprised of an ejection lever 68 reciprocable back and forth relative to the lock lever 62, an operating knob 69 for shifting the ejection lever 68 and a return spring 70 for the ejection lever 68 for urging the lever 68 in a direction away from the lock lever 62 as indicated by the arrow C in FIG. 8.

The ejection lever 68 is slidably mounted to the chassis frame 34 with slide guide pins 71, 71 mounted upright on the inner surface of the chassis frame 34 engaging in slide guide apertures 72, 72 each having its long axis extending lengthwise and with the foremost part of the lever 68 facing to the spring retaining member 62b of the locking lever 62 extended over the chassis frame 34. The operating knob 69 is mounted by a screw 73 to an attachment member 68a formed by bending the upper end side of the ejection lever 68 and has its end knob 69a extended out of a through-hole 74 formed in the outer casing 1. The ejection lever return spring 70 has one end retained in a spring engagement aperture 75 formed in the proximal end of the ejection lever 68 and has its other end retained in a spring retaining aperture 76 formed in the chassis frame 34 for biasing the ejection lever in a direction away from the locking lever 62.

The above described ejection mechanism 67 operates in such a manner that the operating knob 69 is actuated for shifting the ejection lever 68 towards the cassette holder locking lever 62 in the direction of the arrow D against the bias of the ejection lever return spring 70 to thrust the spring retaining member 62b of the locking lever 62 by the end part of the ejection lever 68, so that the cassette holder locking lever 62 is turned in the direction of the arrow E in FIG. 9 against the urging force of the tension coil spring 66 for releasing the locking of the mating locking member 53 of the cassette holder 3 by the locking member 61 for ejecting the cassette holder 3.

It is noted that the operating knob 69 is provided at a position in which it is covered by the outer lid 4.

Outer Lid and Outer Lid Opening and Closure Mechanism (FIGS. 1, 2, 10, 11 and 12)

Figure 10:
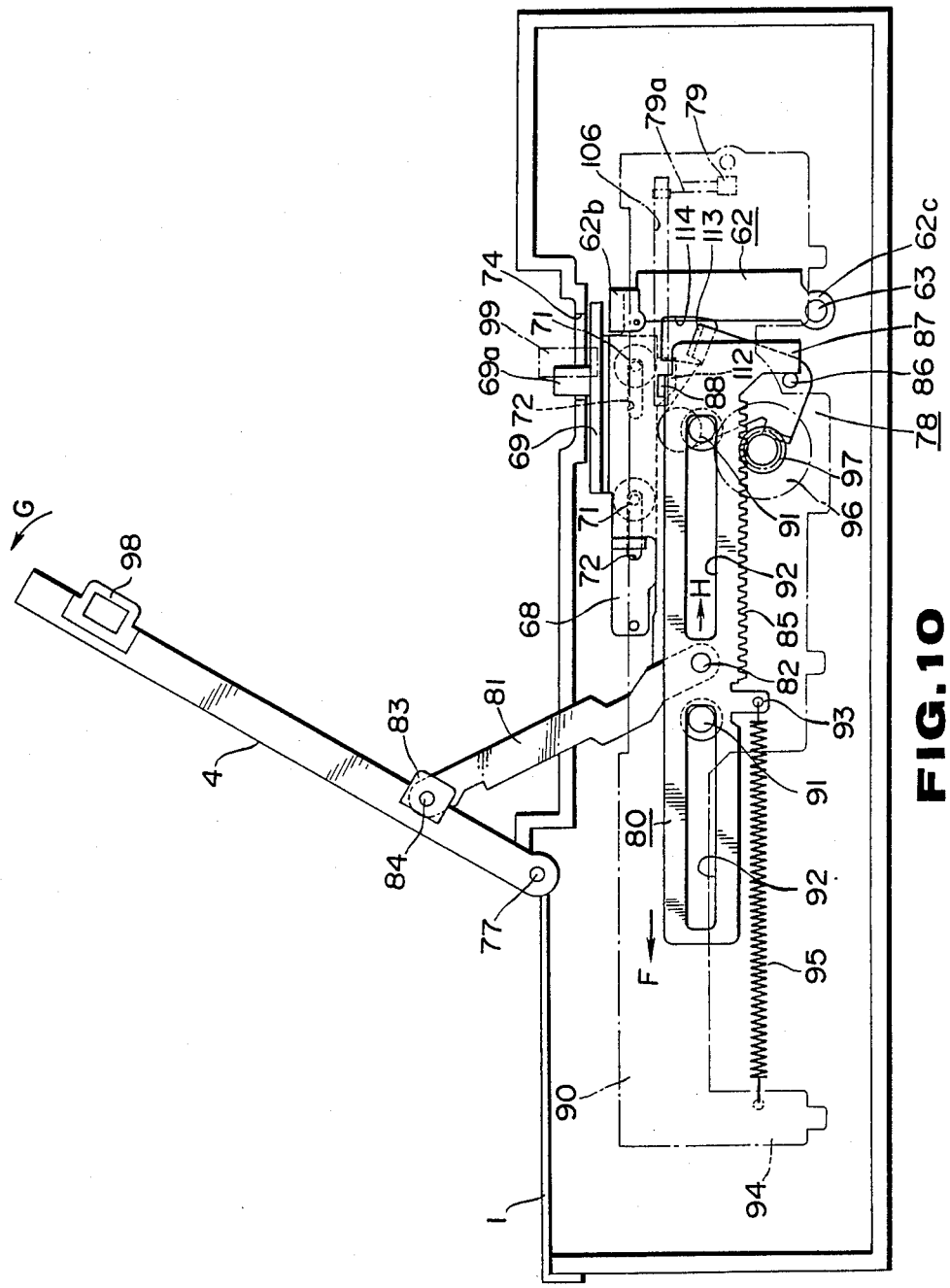
FIG. 10 is a left-hand side view showing an opened state of an outer lid.
Figure 11:
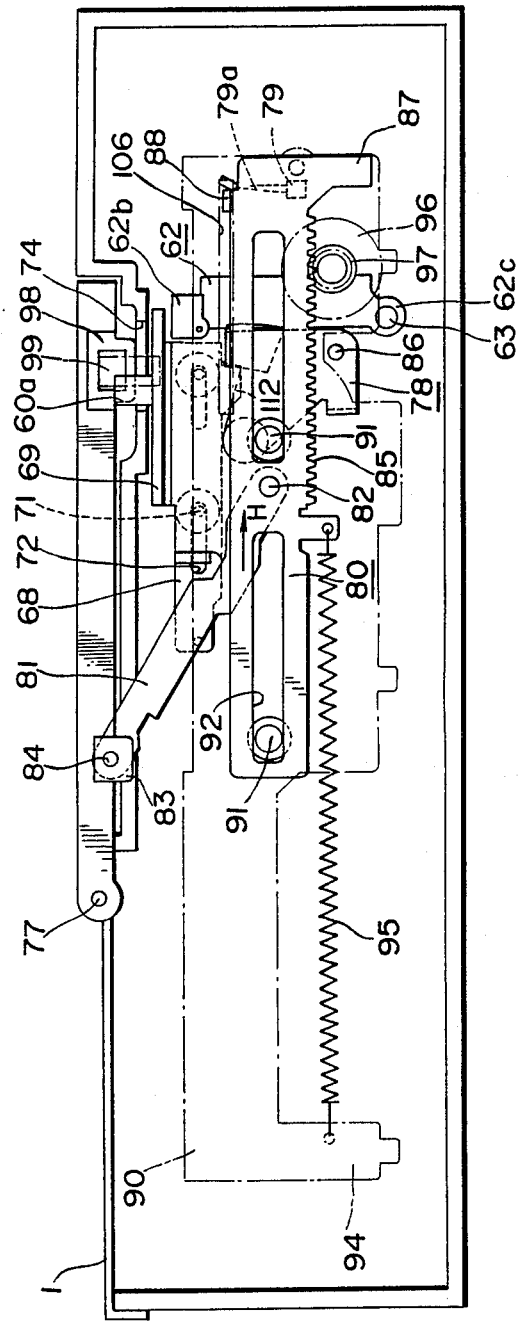
FIG. 11 is a left-hand view showing a closed state of the outer lid.

The rotary magnetic head type audio PCM tape recorder according to the present invention is provided with the outer lid 4 that may be opened and closed independently of the cassette holder 3. As shown in FIG. 2, the outer lid 4 is in the form of a rectangle of a size sufficient to cover at least the cassette holder 3 locked in the tape cassette attachment while also covering the operating knob 69 of the ejection mechanism 67. As shown in FIGS. 10 and 11, the lid is mounted with its proximal end side journaled by a rotary shaft 77 attached to the outer casing 1 so as to cover the cassette holder 3 and be opened and closed a it is turned in the same direction as the rotational direction of the cassette holder 3.

The outer lid 4 is connected by the intermediary of an outer lid opening and closure arm 81 to a rack plate 80 adapted for actuating a loading start switch 79 of a loading mechanism which not only effects a loading operation for loading the magnetic tape 207 on a predetermined tape path but also rotates an ejection locking plate 78. The ejection locking plate 78 is operatively associated with the opening and closure of the outer lid 4 for locking the ejection lever 68 of the ejection mechanism 67 to inhibit the ejection operation or for unlocking the ejection lever 68 to enable the ejection operation. Thus the outer lid opening and closure arm 81 interconnects the outer lid 4 and the rack plate 80 by having its one end journaled at a supporting shaft 82 upstandingly formed at the center of the rack plate 80 and its other end journaled by a supporting shaft 84 upstandingly formed on an attachment member 83 provided towards the journal for the rotary shaft on one side of the outer lid 4.

The rack plate has its lower side edge formed with a rack 85 extending from the forward end side towards the center. An operating pin engaging member 87 engaging with a rotary pin 86 protuberantly formed on the ejection loading plate 78 is formed for depending from the forward end of the rack 85. The upper end side facing to the engaging member 87 is formed with a switch actuating member 88 adapted for thrusting the loading start switch 79. As shown in FIGS. 1 and 10, the rack plate 80 is slidably mounted for sliding in the fore and aft direction along the length of the chassis frame 34, with slide guide pins 91, 91 protuberantly formed on the inner side surface facing to the chassis frame 34 of a mounting plate 90 mounted to the outer lateral surface of the chassis frame 34 engaging with and supported by slide guide apertures 92, 92 each having its long axis extending longitudinally. The rack plate 80 is biased to be shifted towards the journal of the rotary shaft 77 of the outer lid 4 or towards the rear of the mechanical chassis 2 as indicated by the arrow F in FIG. 10 by a tension coil spring 95 installed between a spring retainer 93 formed at the center of the lower side edge of the rack plate and another spring retainer 94 formed on the lower rear side edge of the mounting plate 90. The rack 85 of the rack plate 80 meshes with a pinion 97 formed on a spring damper 96 attached to the outer lateral surface of the mounting plate 90 and protruding via a through-hole formed in the mounting plate 90. In this manner, the rack plate 80 is prevented from recoiling acutely when the rack plate is resiliently returned after it is moved against the urging force of the tension coil spring 95.

The outer lid 4 connected by the opening and closing arm 81 to the rack plate 80 biased towards the journal of the rotary shaft 77 of the outer lid 4 by the tension coil spring 95 and having the journal point of the arm 81 positioned towards the journal point to the rotary shaft 77 is perpetually biased under the shifting force of the rack plate 80 in the lid opening direction as indicated by the arrow G in FIG. 10. When the outer lid 4 is turned about the journal point on the rotary shaft 77 so as to cover the cassette holder 3 that has been shifted to the tape cassette attachment position, the journal side of the opening and closure arm 81 is shifted in the direction of arrow H in FIG. 10 for sliding the rack plate 80 in the same direction of the arrow H in FIGS. 10 and 11 against the force of the tension coil spring 95 for rotationally urging the spring damper 96 having its opinion 97 meshing with the rack 85. With the spring damper 96 rotationally biased during the lid closure operation, an urging force is stored in the spring damper 96 tending to oppose the tensile force of the tension coil spring 95 so that a moderate rotating movement of the outer lid 4 is assured during the lid opening operation.

When the outer lid 4 is closed for covering the cassette holder 3, a lid locking member 100 of an outer lid opening and closure mechanism 99 is engaged with a mating lid locking member 98 provided on one side towards the forward surface of the outer lid for locking the outer lid 4 in the closed position. As shown in FIGS. 12A, B and C, the outer lid opening and closing mechanism 99 adapted to lock the outer lid 4 in the lid closure position is formed by a substantially L-shaped lid locking member 100 including a lock pawl 100a engaging with a mating lid locking member 98 of the outer lid 4 and a rotary member 100b and by an opening and closure knob 101 adapted to turn the lid locking member 100 for unlocking the outer lid 4. The lid locking member 100 is mounted by having the rotary member 100b positioned for facing the mating lid locking member 98 of the outer lid 4 in the closed position, and by having its proximal journal point 100C journaled on a supporting shaft 102 provided to the outer casing 1, such that the member 100 is rotationally urged by a torsion coil spring, not shown, in a direction in which the lock pawl 100a is engaged with the mating lid locking member 98. The opening and closure member 101 is slidably supported by the outer casing 1 by having its knob 101a protruding from a through-hole 105 formed in the upper side of the outer casing 1, as shown in FIG. 2 and by having its rotary member 101b on the lower side of the outer casing 1 positioned for facing the rotary member 100b of the lid locking member 100. Also, as shown in FIG. 12A, a compression coil spring 103 operatively linked with the outer casing 1 is also operatively linked with the opening and closure member 101 so that the member 101 is biased to be shifted in a direction shown by the arrow I in FIG. 12A in which the rotary member 101b is moved away from the rotary member 100b of the lid locking member 100. It is noted that the shifting position of the operating knob 101 is limited by a position regulating member protuberantly formed on the outer casing 1.

In the above described outer lid opening and closure mechanism 99, when the outer lid 4 is turned to the lid closing position, the locking pawl 100a of the lid locking member 100 is engaged with a mating frame locking member 98 for locking the outer lid 4. When the operating knob 101 is moved against the urging force of the compression coil spring 103, an inclined surface 101c of the rotary member 101b gradually thrusts the rotary member 100b of the lid locking member 100, as shown in FIG. 12c, such that the lid locking member 100 is turned in a direction in which the locking pawl 100a is moved away from the mating lid locking member 98 for unlocking the outer lid 4. When the outer lid 4 is unlocked by the operation of the operating knob 101, the outer lid 4 is automatically returned to the lid opening position under the urging force of the tension coil spring 95 urging the rack plate 80 to be shifted as described in the foregoing.

The mounting plate 90 is mounted to the chassis frame 34 by having its mating engaging member 90a protuberantly formed on the lower side edge of the plate 90 and engaged in an engaging aperture 89a of an engaging member 89 protuberantly formed on the chassis frame 34 and its screw mounting member 90b protuberantly formed on the upper side edge of the plate 90 and threaded to a mating screw member 89b on the chassis frame 34 by a screw 90c.

Ejection Inhibit Mechanism (FIGS. 1, 8, 9, 10 and 11)

The ejection locking plate 78 of the ejection locking mechanism is mounted on the outer side surface of the chassis frame 34 in the vicinity of the ejection lever 68 on which the mounting plate 90 mounting the rack plate 80 is mounted. As shown in FIGS. 1, 8 and 9, the ejection locking plate 78 is substantially sector-shaped and has a through-hole 111 at the proximal end into which a journal shaft 110 is introduced. On one forward end side opposite to the through-hole 111 is formed a retaining member 113 adapted for engaging with a mating engaging member 112 protuberantly formed on the forward lower side edge of the ejection lever 68. On the other side of the plate 78 opposite to the retaining member 113 is formed the rotary pin 86 projecting in a direction opposite to the projecting direction of the retaining member 113 for engagement with the engaging member 87 provided to the forward end of the rack plate 80. The ejection locking plate 78 is rotatably mounted to the chassis frame 34 with the retaining member 113 passed through a substantially sector-shaped member 113 passed through a substantially sector-shaped opening 114 formed in the chassis frame 34 for facing the engaging member 112 of the ejection lever 68 and with the rotary pin 86 engaging with the pin 87, the journal shaft 110 being passed through the through-hole 111. A tension coil spring 116 having one end retained by a spring retainer 115 formed on the forward end side of the mechanical chassis 2 has its other end retained by a spring retainer 117 extending in a direction opposite to the projecting direction of the rotary pin 86, so that the ejection locking plate 78 is rotationally biased in a direction shown by the arrow J in FIG. 8 in which the retaining member 113 is engaged with the engaging member 112 of the ejection lever 68.

Thus, in a state in which the ejection locking plate 78 is not turned against the urging of the tension coil spring 116, the shifting of the ejection lever 68 in the direction shown by the arrow in FIG. 9 against the ejection lever return spring 70 is inhibited to disable the rotation of the locking lever to inhibit the ejection of the cassette holder 3.

When the outer lid 4 is opened and the rack plate 80 is shifted towards the front of the chassis 2 as indicated by the arrow H in FIG. 11 against the urging force of the tension spring 95, the rotary pin 86 is turned by the rotary pin engaging member 87 and the ejection locking plate 78 is turned about the journal shaft 110 as indicated by the arrow K in FIG. 9, the engaging member 113 disengaging from the engaging member 112 of the ejection lever 68 to permit the sliding of the ejection lever 68. In this manner, the lock lever 62 may be turned to eject the cassette holder 3.

Unlocking Inhibit Mechanism for Cassette Holder Locking Mechanism (FIGS. 3, 4, 13 and 14)

In the rotary magnetic head type audio PCM tape recorder of the present invention, there is provided an unlocking inhibit mechanism 118 for inhibiting the unlocking of the cassette holder locking mechanism 60 for inhibiting ejection of the cassette holder 3 and taking-out of the cassette holder 3 during the operation of the loading mechanism, that is, during loading and unloading of the magnetic tape 207, and when the tape 207 has been loaded onto the tape path.

Figure 13:
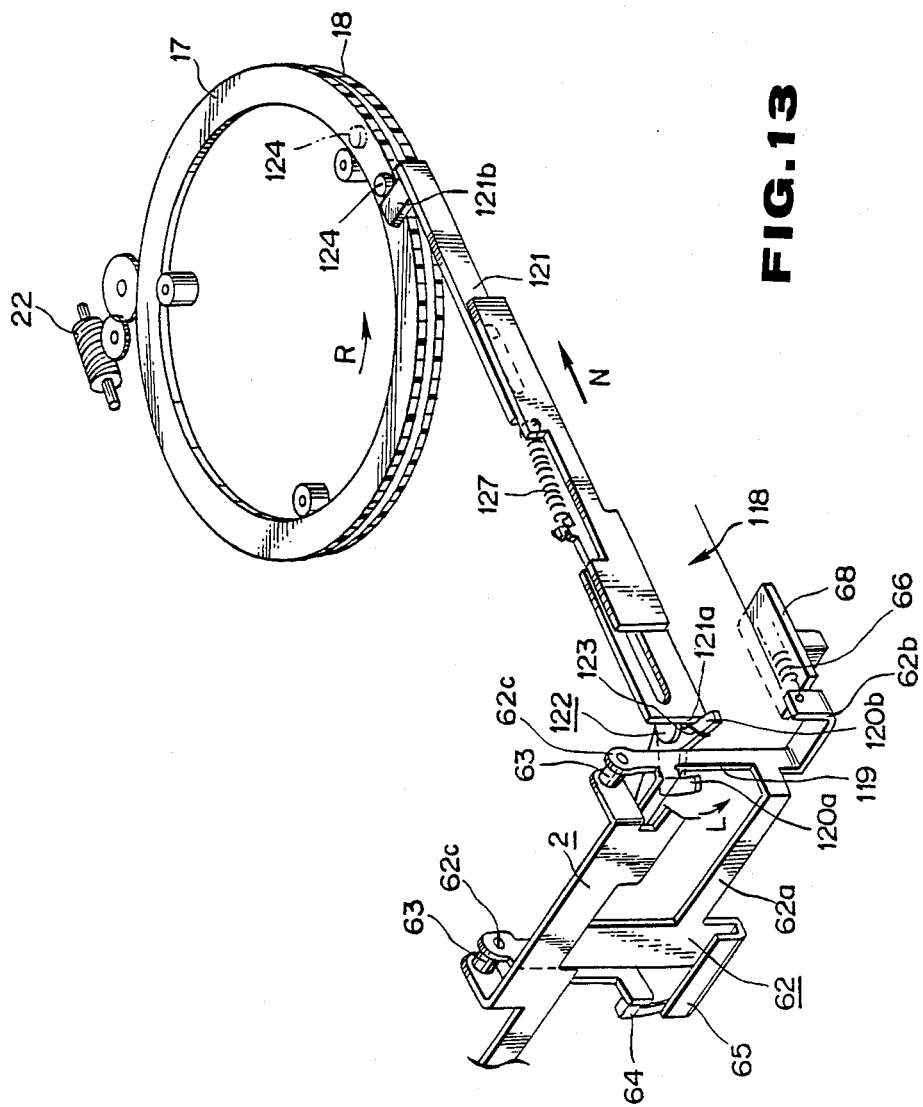
FIG. 13 is a perspective view showing an unlocking portion of a cassette holder locking mechanism.

As shown in FIG. 13, the unlocking mechanism 118 is comprised of a rotary inhibit lever 120 engaging with one side of a cut-out 119 formed in the rotary member 62a of the cassette holder locking lever 62, and a shifting lever 121 adapted for rotating the rotation inhibit lever 120 by being shifted by rotation of the loading rings 17 and 18 adapted for shifting the loading mechanism including shift guide blocks 11 and 12 for loading the magnetic tape 207.

As shown in FIGS. 3 and 13, the rotation inhibit lever 120 is substantially L-shaped and has its end locking pawl 120a positioned within the cut-out 119 in the rotary member 62a of the cassette holder locking member 62 and rotatably supported by a supporting member 122 protuberantly formed on the lower surface of the mechanical chassis 2. The rotation inhibit lever is mounted so as to be rotationally biased in the direction indicated by the arrow L in which the locking pawl 120a is engaged in the cut-out 119 by a torsion coil spring 123 placed around the shaft 122. The shifting lever 121 is slidably mounted parallel to the direction of extension of the chassis frame 34 with an end rotary member 121a for the rotation inhibit lever positioned facing to a mating rotary member 120b protuberantly formed on the other end of the rotation inhibit lever 120, with a mating thrusting member 121b at the proximal end positioned facing to the rotary trajectory of a shifting pin 124 protuberantly formed on the loading ring 17 and with a slide guide shaft 126 protuberantly formed on one side on the lower surface of the mechanical chassis 2 engaging in a slide guide aperture 125 having a longer axis extending longitudinally. This shifting lever 121 is biased so as to be shifted by a tension coil spring 127 having one end retained by the mechanical chassis 2 in a direction in which the end rotary member 121a for the rotation inhibit lever is spaced apart from the mating rotary member 120b at the other end of the rotation inhibit lever 120 as indicated by the arrow N in FIG. 13. A shifting pin 124 is mounted on the loading ring 16 at a position in which, when the shift guide blocks 11 and 12, pinch roll supporting arm 26, tape guide supporting arm 26, tape guide supporting arm 28 and the tension regulating arm 30 to an inoperative state of not loading the magnetic tape 207, the shifting pin 124 thrusts the mating thrusting member 121b to shift the shifting lever 121 against the force of the tension coil spring 127 to cause the shifting lever 121 to be turned in a direction of disengaging the locking pawl 120a of the rotation inhibit lever 120 from the cassette holder locking lever 62.

In the above described unlocking inhibit mechanism 118, when the loading ring 17 is turned in a direction shown by the arrow R in FIG. 12 in which the shift guide blocks 11 and 12 and other related units are moved towards the rotary magnetic head device 10 for pulling the tape 207 out of the tape cassette 201, the shifting pin 124 is shifted away from the mating thrusting member 121b of the shifting lever 121. The lever 121 is shifted in a direction indicated by the arrow N in FIG. 12 under the bias of the tension coil spring 127 and the end rotary member 121a is shifted away from the rotary member 120b of the rotation inhibit lever 120, which is rotationally urged in the direction of the arrow L in FIG. 13 under the force of the torsion coil spring 123, the locking pawl 120a being thus engaged with the rotary member 62a of the cassette holder locking lever 62 to lock the cassette holder locking lever 62 to inhibit the rotation.

Thus, in the state in which the loading mechanism is energized, with the tape 207 pulled out onto the tape passage out of the tape cassette 201, the cassette holder locking lever 62 is locked to inhibit the ejection of the cassette holder 3.

Tape Cassette Attachment Sensor Mechanism (FIGS. 6, 7, 14 and 15)

In the rotary magnetic head type audio PCM tape recorder according to the present invention, there is provided a tape cassette attachment sensor mechanism that enables the driving of the loading motor 21 rotationally driving the loading rings 17 and 18 for actuating the loading mechanism, on the condition that it has been sensed that the cassette holder 3 accommodating and holding the tape cassette 201 therein is locked at the tape cassette attachment position and the tape cassette 201 is attached at the tape cassette attachment position, in order to prevent troubles or defects in the loading of the magnetic tape 207 or an injury to unite such as the loading mechanism or the magnetic tape 207, caused by the actuation of the loading unit in the state in which the tape cassette 201 is not attached correctly at the tape cassette attachment position.

The tape cassette attachment sensor mechanism is comprised of a cassette holder locking sensor switch 64 actuated by the cassette holder locking lever 62 when the cassette holder 3 is locked by the lever 62 to sense the attachment sensor switches 128, 128 actuated by the tape cassette 201 when the tape cassette is attached at the tape cassette attachment position for sensing the attachment of the tape cassette 201.

The cassette holder locking sensor switch 64 is mounted to the forward end side of the mechanical chassis 2 and, as shown in FIG. 6, it is mounted so that a pair of contact actuating members 129a, 129b are engaged with the inner lateral sides of the switch thrust member 65 protuberantly formed on one side of the cassette holder locking lever 62. When the cassette holder locking lever 62 is not turned against the urging force of the tension coil spring 66 and is erected upright with respect to the mechanical chassis 2, the contact actuating member 129a is thrusted by the switch thrust member 65, as shown in FIG. 6, for contacting with the other contact actuating member 129b for holding the turn-on state of the cassette holder locking sensor switch 64.

The tape cassette attachment sensor switches 128, 128 are provided at positions transversely symmetrical with respect to the height position setting pin 9 on the mechanical chassis 2 as center and in registration with the cut-outs 42a on both sides on the forward end side of the bottom plate 42 of the cassette holder 3. At these positions, the switches can be actuated by the rear bottom surface protuberant from the cassette holder 3 of the tape cassette 201 inserted into and held within the cassette holder 3.

Figure 14:
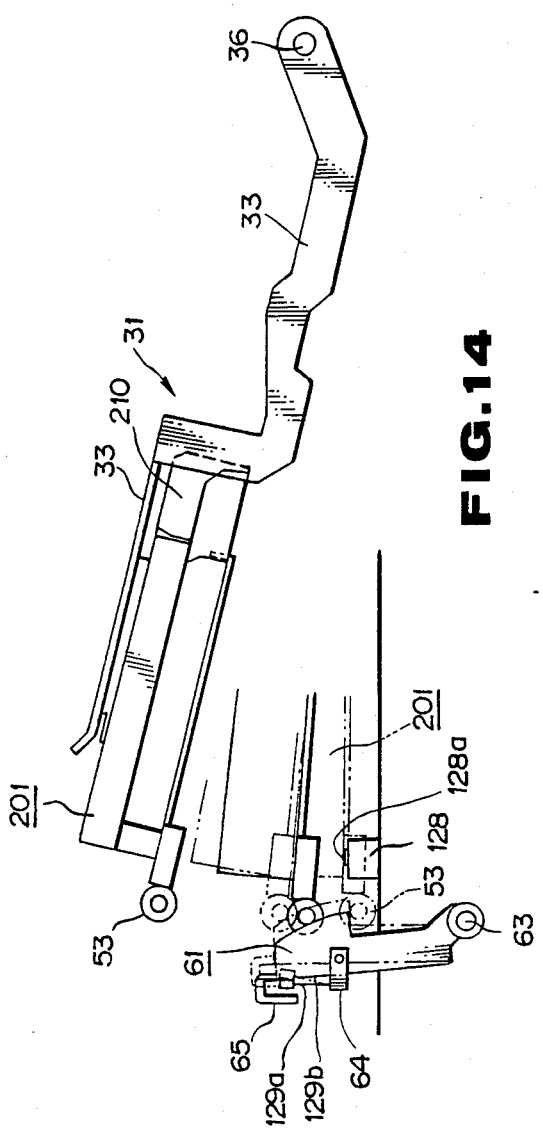
FIG. 14 is a diagrammatic side view showing an operating state of a cassette holder locking sensor switch.
Figure 15:
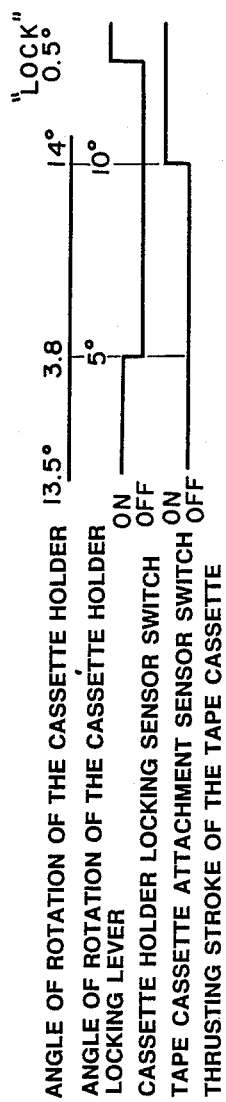
FIG. 15 is a time chart showing operating states of a cassette holder locking sensor switch and a tape cassette attachment sensor switch.
Figure 16:
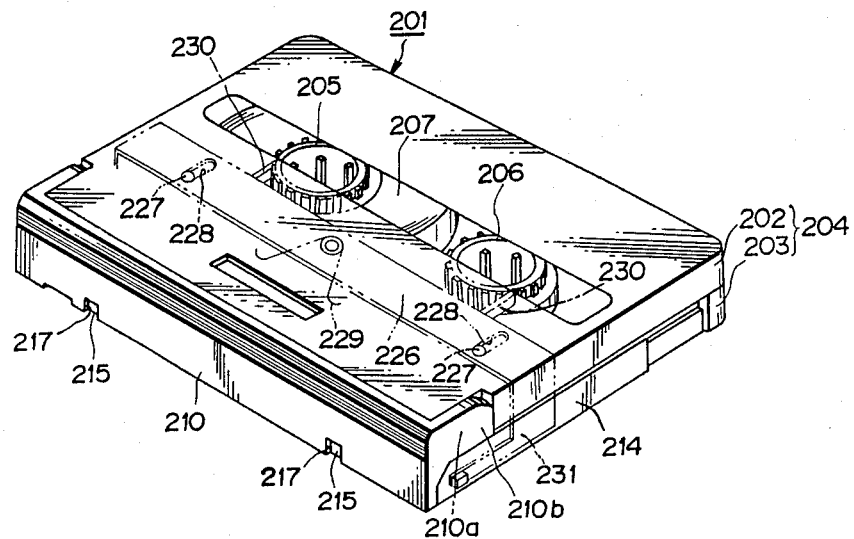
FIG. 16 is a perspective view from an upper surface side of a tape cassette employed in a rotating magnetic head type digital audio tape recorder.

When the cassette holder locking lever 62 is not actuated, the cassette holder locking sensor switch 64 is in the turn-off state, as shown in FIG. 15. When the cassette holder 3 is turned towards the tape cassette attachment position, so that the locking member 62 is thrusted by the mating locking member 53, the cassette holder locking lever 62 being turned a predetermined angle as shown in FIG. 14 against the urging of the tension coil spring 66, the contact actuating member 129a is released from pressuring by the switch thrusting member 65, so that the switch 64 is turned off, as shown in FIG. 15. When the cassette holder 3 is turned towards the tape cassette attachment position, so that the locking state of the cassette holder 3 is reached in which the mating locking member 53 is engaged with the locking member 62, the locking member 62 is returned under the biasing force of the tension coil spring 66, the switching thrusting member 65 again thrusting the contact actuating member 129a, so that the cassette holder lock sensor switch 64 is turned on, as shown in FIG. 15. Thus the cassette holder lock sensor switch 64 senses the locked state of the cassette holder 3 by the cassette holder 62 when the switch 64 is again turned on after it has been turned off by the rotation of the cassette holder 3 towards the tape cassette attachment position.

On the other hand, when the cassette holder 3 is turned slightly as shown in FIG. 14 after it is turned towards the tape cassette attachment position, the cassette holder 3 then turning the cassette holder lock sensor switch 64 momentarily off, the actuating member 128a is thrusted by the tape cassette 201 inserted and held in the cassette holder 3, so that the switches are turned on as shown in FIG. 15 by the thrusting operation by the tape cassette 201. At this time, both switches 128, 128 are thrusted for issuing tape cassette attachment detection outputs. Since it is when both of the tape cassette attachment sensor switches 128, 128 mounted at the transversely symmetrical positions are thrusted that the tape cassette attachment output signals are issued, attachment of the tape cassette 201 at the correct tape cassette attachment position can be sensed accurately.

The operation of the loading motor 21 is enabled only when both outputs of the tape cassette attachment sensor switches 128, 128 and the cassette holder locking sensor switch 64 are obtained simultaneously.

Loading Start Actuating Mechanism (FIGS. 1, 10 and 11)

In the rotary magnetic head type audio PCM tape recorder according to the present invention, the loading motor 21 is driven into rotation when the outer lid 4 that may be turned independently of the cassette holder 3 is closed after the attachment of the tape cassette 201 at the tape cassette attachment position.

Thus the loading start switch 79 actuated by the rack plate 80 shifted by the opening and closure of the outer lid 4 is mounted by the intermediary of the mounting plate 90. This loading switch 79 is mounted at a position in which, when the outer lid 4 is closed and the rack plate 80 is shifted with the operating member 79a facing to the switch thrusting member 88 of the rack plate 80 via through-hole 106 formed in the mounting plate 90, the operating member 79a is thrusted by the switch thrusting member 88.

By providing the loading start switch 79 actuated in connection with the closure of the cassette holder 3 by the outer lid 4, the operation of the loading mechanism can be started by the reliable operation after the termination of attachment of the tape cassette 201 at the tape cassette attachment position.

Tape Cassette Attachment and Loading Operations

The operation of attaching the tape cassette 201 and that of loading the tape 207 contained in the tape cassette 201 in the rotary magnetic head type audio PCM tape recorder according to the present invention will be hereafter explained.

When attaching the tape cassette 201 at the tape cassette attachment position, the opening and closure member 102 of the outer lid opening and closure mechanism 99 is actuated for setting the outer lid 4 to the open position as shown in FIGS. 2 and 10. When the outer lid 4 is opened the rack plate 80 is shifted by the tension coil spring 95 as shown in FIGS. 9 and 10, so that the ejection lever 68 to enable the shifting of the ejection lever 68. At this time, the ejection lever 68 is shifted for turning the cassette holder lock lever 62 against the urging force of the tension coil spring 66 for restoring the cassette holder 3 to the ejection position as shown in FIG. 6.

At this time, the loading rings 17 and 18 are in the inoperative position in which the rings 17 and 18 have displaced the loading mechanism including the shifting guide blocks 11, 12 towards the tape attachment position. The loading rings 17 and 18 in this position pressure the shift lever 121 to cause the rotation inhibit lever 120 to be turned against the force of the torsion coil spring 123 to disengaged the lever from the cassette holder lock lever 62.

After the cassette holder 3 is ejected in the above described manner, the tape cassette 201 is introduced into the cassette holder 3. When the tape cassette 201 is inserted from the front lid 210, the closure plate 214 being shifted for opening the through-holes 212, 213 on the bottom surface of the cassette body 204 to enable the turning of the front lid 210, the tape reels 205 and 206 are unlocked and are maintained in the predetermined inserting and holding position in the rotation-enabled state.

The cassette holder 3 accommodating and holding the tape cassette 201 is turned towards the tape cassette attachment position until the mating locking member 53 is locked to the cassette holder lock lever 62 as shown in FIG. 7. When the cassette holder 3 is turned to the tape cassette attachment position, the front lid 210 is turned by the lid opening member 58 for opening the front side of the cassette body 204 to enable the magnet tape 207 to be pulled out by the loading mechanism. Also the reel shafts 5, 6 mounted at the tape cassette attachment position are engaged with the tape reels 205 and 206 to enable the rotation of the tape reels.

At this time, when the cassette holder 3 is locked to the cassette holder lock lever 62 and the tape cassette 201 is attached correctly with the height level correctly set by the height level setting pin 9, the locking of the cassette holder 3 and the attachment of the tape cassette 210 are sensed by the cassette holder locking sensor switch 64 and the tape cassette attachment sensor switches 218, 218 for enabling the starting of the operation of the loading mechanism, as describe hereinabove.

After the tape cassette 201 is attached to the tape cassette attachment position, the outer lid 4 is closed for covering the cassette holder 3, as shown in FIG. 11. When the outer lid 4 is closed, the rack plate 80 connected to the outer lid 4 by the medium of the outer cover 81 is shifted against the bias of the tension coil spring 95 so that the ejection locking plate 78 is engaged with the ejection lever 68, as shown in FIG. 8, for inhibiting the operation of the ejection lever 68 and disabling the ejection of the cassette holder 3. Therefore, once the outer lid 4 is turned to the vicinity of the lid closing position, an ejection operation may be performed by the ejection lever 68.

When the outer lid 4 is closed, the lock start switch 79 is actuated by the switch thrusting member 88 provided to the rack plate 80 as shown in FIG. 11 to start the rotation of the loading motor 21 When the loading motor 21 is driven into rotation, the loading reels 17 and 18 are driven into rotation so that the loading mechanism including the shifting guide blocks 11 and 12 are actuated to pull the magnetic tape 207 out of the tape cassette 201 to cause the tape to be delivered to the predetermined tape passage to terminate the loading.

It is noted that, when the loading motor 21 is driven into rotation such that the loading rings 17 and 18 are turned, the shifting lever 121 is released from pressure by the shifting pin 124, as shown in FIG. 13. The shifting lever 121 is shifted by the torsion coil spring 127, as shown in FIG. 13, for releasing the rotational biasing of the rotation inhibit lever 120. The rotation inhibit lever 120 is turned by the torsion coil spring 123 so as to be engaged with the cassette holder lock lever 62 to inhibit the rotation of the cassette lock lever 62. This state is continued until the loading rings 17 and 18 cause the loading mechanism including the shifting guide blocks 11 and 12 to be again returned to the inoperative position towards the tape cassette attachment position.

In the above embodiments, the present invention is explained by taking an example of a rotary magnetic head tape audio PCM tape recorder. However, the present invention may be applied extensively to a cassette type magnetic recording/reproducing apparatus wherein a tape cassette is used as the recording medium and a tape cassette transfer member such as a cassette holder holding the tape cassette is moved from the tape cassette inserting and detaching position to the tape cassette attachment position for attaching the tape cassette at the predetermined tape cassette attachment position.

What I claim is:

1. A cassette type magnetic recording/reproducing apparatus, comprising:
    a cassette holder supported for movement between a tape cassette inserting and detachment position and a tape cassette attachment position;
    locking means for locking said cassette holder in said tape cassette attachment position;
    cassette holder lock sensor means for sensing when said cassette holder is locked in said tape cassette attachment position;
    tape cassette attachment sensor means for sensing when a tape cassette accommodated and held in said cassette holder is attached at the tape cassette attachment position;
    tape loading means for pulling a magnetic tape accommodated within a tape cassette held at said tape cassette attachment position out of the tape cassette for loading onto a predetermined tape running path; and
    means for actuating said loading means only when the locking of said cassette holder is sensed by said cassette holder lock sensing means simultaneously with the sensing of tape cassette attachment by said tape cassette attachment sensing means.

2. The apparatus according to claim 1, wherein said cassette holder lock sensor means includes a first sensor switch actuatable by the locking of said locking means.

3. The apparatus according to claim 1, wherein said tape cassette attachment sensor means includes a second sensor switch actuatable by the tape cassette when the tape cassette is attached at the tape attachment position.

4. The apparatus according to claim 3, wherein said sensor means includes at least a pair of said second sensor switches.

5. A cassette type magnetic recording/reproducing apparatus according to claim 1, further comprising:
    ejection means for actuating said locking means for unlocking said cassette holder; and
    unlocking inhibit means shifted in associated with movement of said tape loading means and engaging with said locking means for inhibiting the unlocking of said cassette holder by movement of said ejection means.

6. A cassette type magnetic recording/reproducing apparatus, comprising:
    a cassette holder supported for movement between a tape cassette inserting and detachment position and a tape cassette attachment position;
    an outer lid provided so as to be openable and closeable independently of said cassette holder and adapted to be closed to cover at least said cassette holder in said tape cassette attachment position;
    outer lid sensor means for sensing a closed state of said outer lid;
    tape loading means for pulling a magnetic tape accommodated within a tape cassette held at said tape cassette attachment position out of the cassette for loading onto a predetermined tape running path; and
    loading starting means for starting the loading of the magnetic tape by said tape loading means when said outer lid sensor means senses the closure of said outer lid.

7. The apparatus according to claim 6, wherein said outer lid sensor means includes a rack plate provided so as to be shiftable by closure of said outer lid, and a third sensor switch actuatable by shifting of said rack plate.

8. The apparatus according to claim 6; and further comprising locking means for locking said cassette holder in said tape cassette attachment position, cassette holder lock sensor means for sensing that said cassette holder is locked by said locking means, and tape cassette attachment means for sensing that the tape cassette inserted and held in said cassette holder is attached at said tape cassette attachment position, said loading starting means being actuated only when the closure of said outer lid is sensed by said outer lid sensor means under the condition that the locking of said cassette holder and attachment of said tape cassette are sensed by said cassette holder lock sensor means and said tape cassette attachment sensor means, respectively.

9. A cassette type magnetic recording/reproducing apparatus according to claim 6, further comprising:
ejection means for ejecting said cassette holder; and
ejection inhibit means shiftable in association with the opening and closing of said outer lid and engagable with said ejection means when said outer lid reaches the vicinity of a lid closure position for inhibiting the ejection by said ejection means.

* * * * *